United States Patent
Fukushige et al.

(10) Patent No.: US 11,370,426 B2
(45) Date of Patent: Jun. 28, 2022

(54) VEHICLE TRAVEL CONTROL METHOD AND TRAVEL CONTROL DEVICE

(71) Applicant: Nissan Motor Co., Ltd., Yokohama (JP)

(72) Inventors: Takashi Fukushige, Kanagawa (JP); Satoshi Tange, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 17/424,309

(22) PCT Filed: Jan. 22, 2019

(86) PCT No.: PCT/IB2019/000064
§ 371 (c)(1),
(2) Date: Jul. 20, 2021

(87) PCT Pub. No.: WO2020/152490
PCT Pub. Date: Jul. 30, 2020

(65) Prior Publication Data
US 2022/0080964 A1    Mar. 17, 2022

(51) Int. Cl.
*B60W 30/12* (2020.01)
*B60W 60/00* (2020.01)
(Continued)

(52) U.S. Cl.
CPC ............ *B60W 30/12* (2013.01); *B60W 10/18* (2013.01); *B60W 10/20* (2013.01); *B60W 40/04* (2013.01);
(Continued)

(58) Field of Classification Search
CPC .... B60W 30/12; B60W 60/001; B60W 10/18; B60W 10/20; B60W 40/04; B60W 40/06;
(Continued)

(56) References Cited

U.S. PATENT DOCUMENTS

2019/0329766 A1\* 10/2019 Ishioka ............... B60W 30/095

FOREIGN PATENT DOCUMENTS

| JP | 2011-186878 A | 9/2011 |
| JP | 2015-16799 A | 1/2015 |
| JP | 2015-232866 A | 12/2015 |

\* cited by examiner

*Primary Examiner* — Nadeem Odeh
(74) *Attorney, Agent, or Firm* — Young Basile Hanlon & MacFarlane, P.C.

(57) ABSTRACT

A travel control method comprises: detecting a travelable road area of the road area in which the subject vehicle can travel; generating a potential field in a space of the travelable road area in which a potential value of a left-side boundary line and a right-side boundary line are set to different values from each other; calculating a travelable road area width by applying the Potential Method; comparing the difference between a lateral position of a travel route set on the basis of the calculated travelable road area width and a lateral position of the travel route set in advance in the travelable road area on the basis of the left-side boundary line or the right-side boundary line; correcting the potential value; regenerating the potential field set to the corrected potential value; generating the travel route applying the Potential Method to the regenerated potential field; executing autonomous travel control.

11 Claims, 16 Drawing Sheets

(51) Int. Cl.
*B60W 10/18* (2012.01)
*B60W 10/20* (2006.01)
*B60W 40/04* (2006.01)
*B60W 40/06* (2012.01)

(52) U.S. Cl.
CPC .......... *B60W 40/06* (2013.01); *B60W 60/001* (2020.02); *B60W 2552/05* (2020.02); *B60W 2552/53* (2020.02); *B60W 2554/20* (2020.02); *B60W 2554/40* (2020.02); *B60W 2555/60* (2020.02); *B60W 2555/80* (2020.02)

(58) Field of Classification Search
CPC ......... B60W 2552/05; B60W 2552/53; B60W 2554/20; B60W 2554/40; B60W 2555/60; B60W 2555/80
See application file for complete search history.

FIG. 4
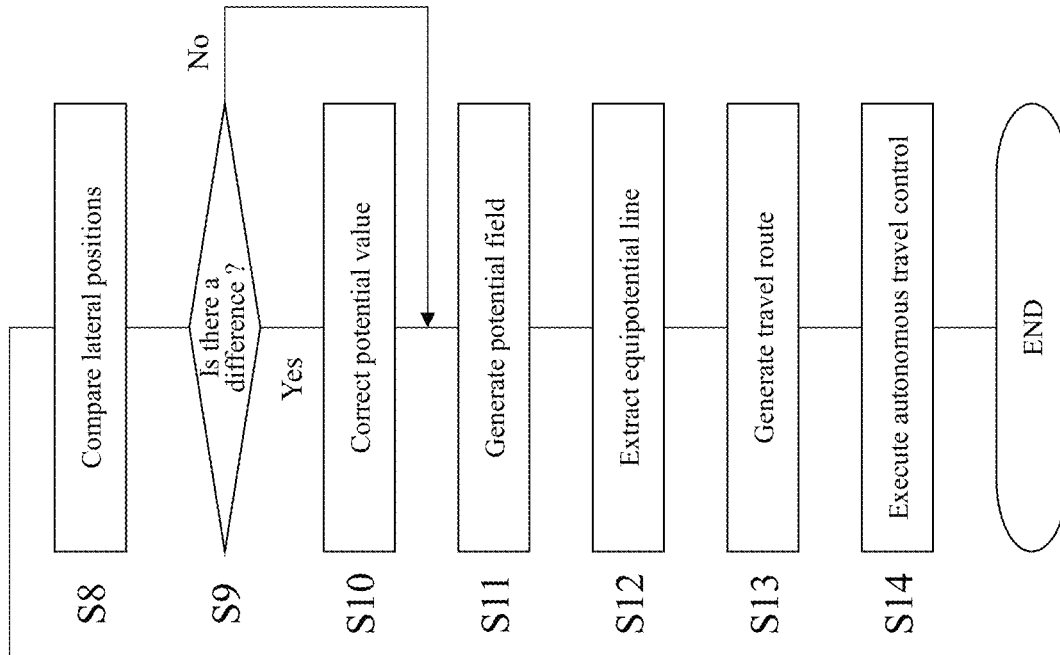
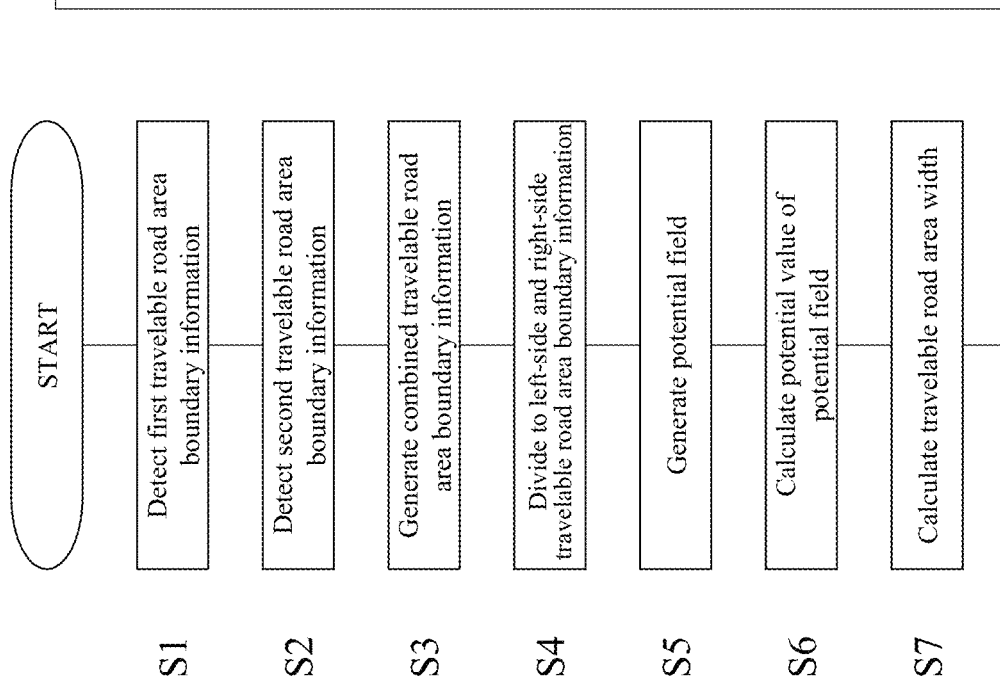

FIG. 10

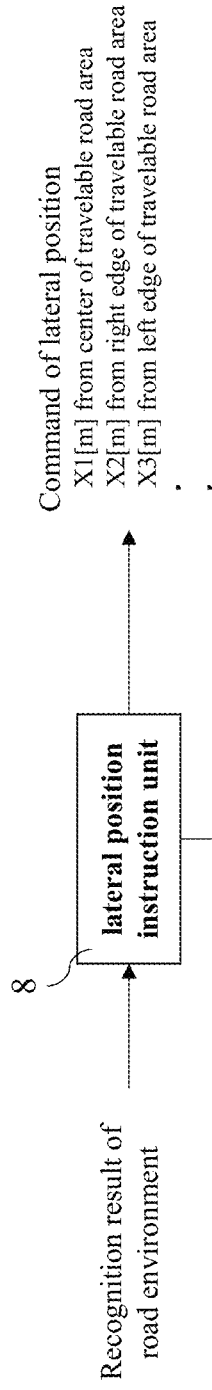

Recognition result of road environment → lateral position instruction unit → Command of lateral position
X1[m] from center of travelable road area
X2[m] from right edge of travelable road area
X3[m] from left edge of travelable road area
. .

| Road environment | National information | Other conditions | Command contents of lateral position |
|---|---|---|---|
| | Country with traffic laws and regulations for left-hand traffic | | 1.5m to the left direction from the right edge of the travelable road area |
| | Country with traffic laws and regulations for right-hand traffic | | 1.5m to the right direction from the left edge of the travelable road area |
| Lane with many parked vehicles | National information is not acquired | Frequency of the left-side travelable road area boundary information is low | 1.5m to the right direction from the left edge of the travelable road area |
| | | Frequency of the right-side travelable road area boundary information is low | 1.5m to the left direction from the right edge of the travelable road area |
| Other | | | X1m from center of travelable road area |

FIG. 11
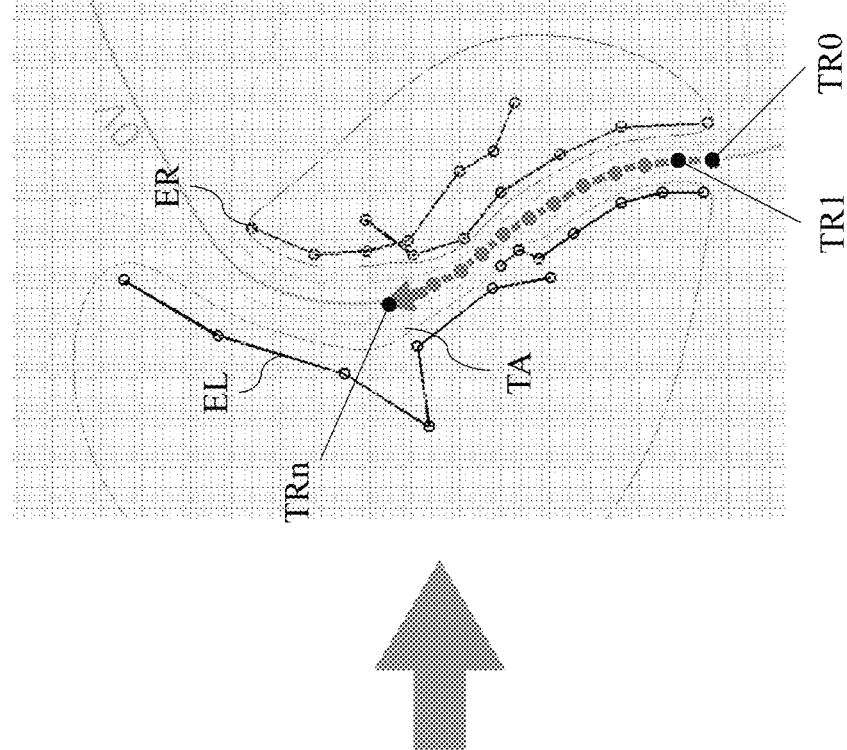
Search for equipotential line
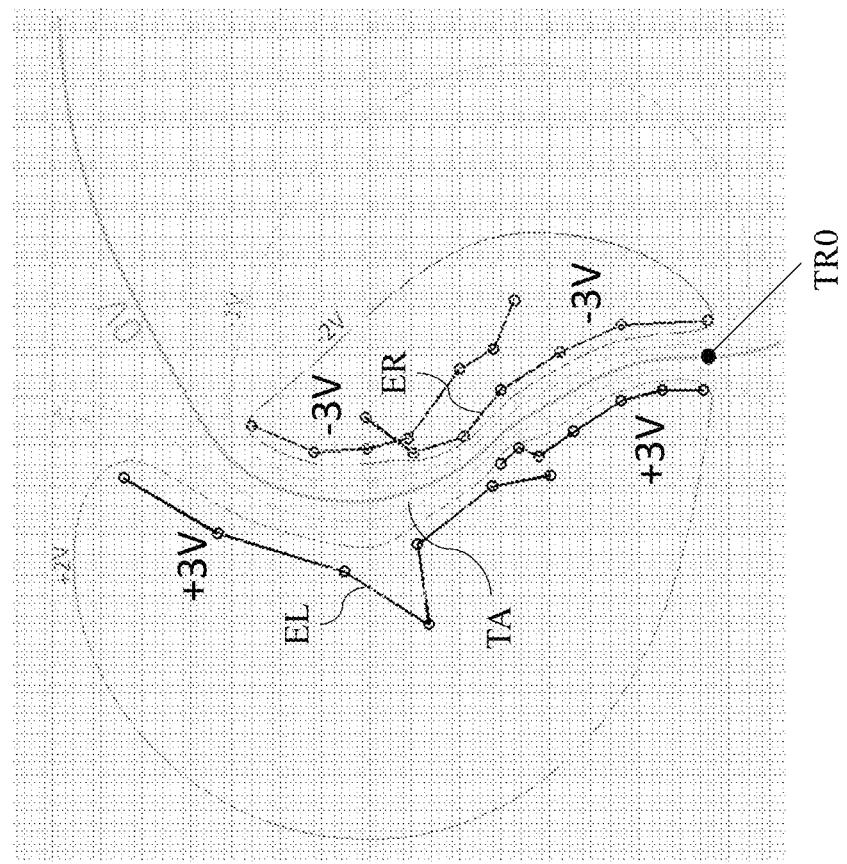
Determine start point of travelable road area

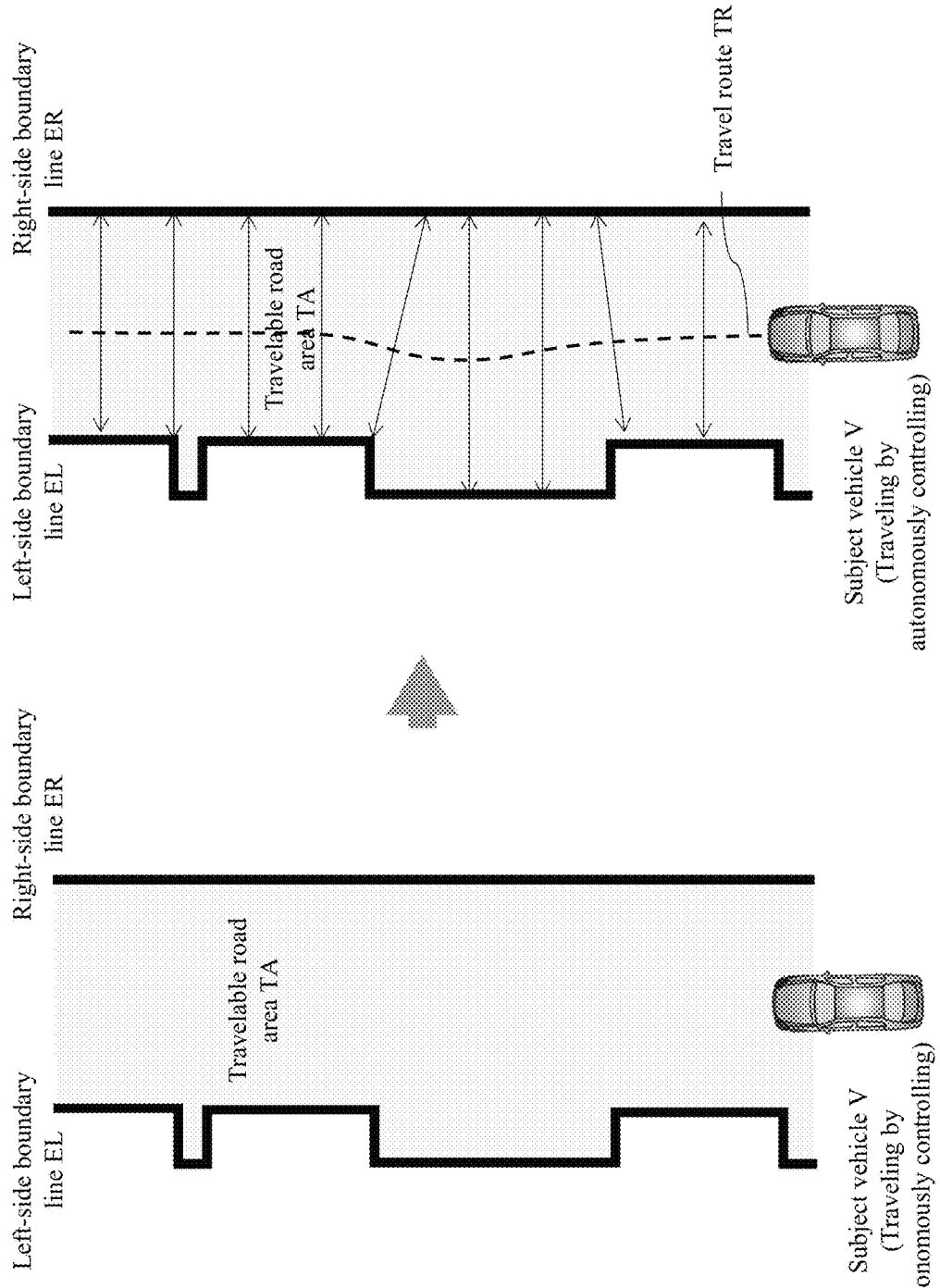

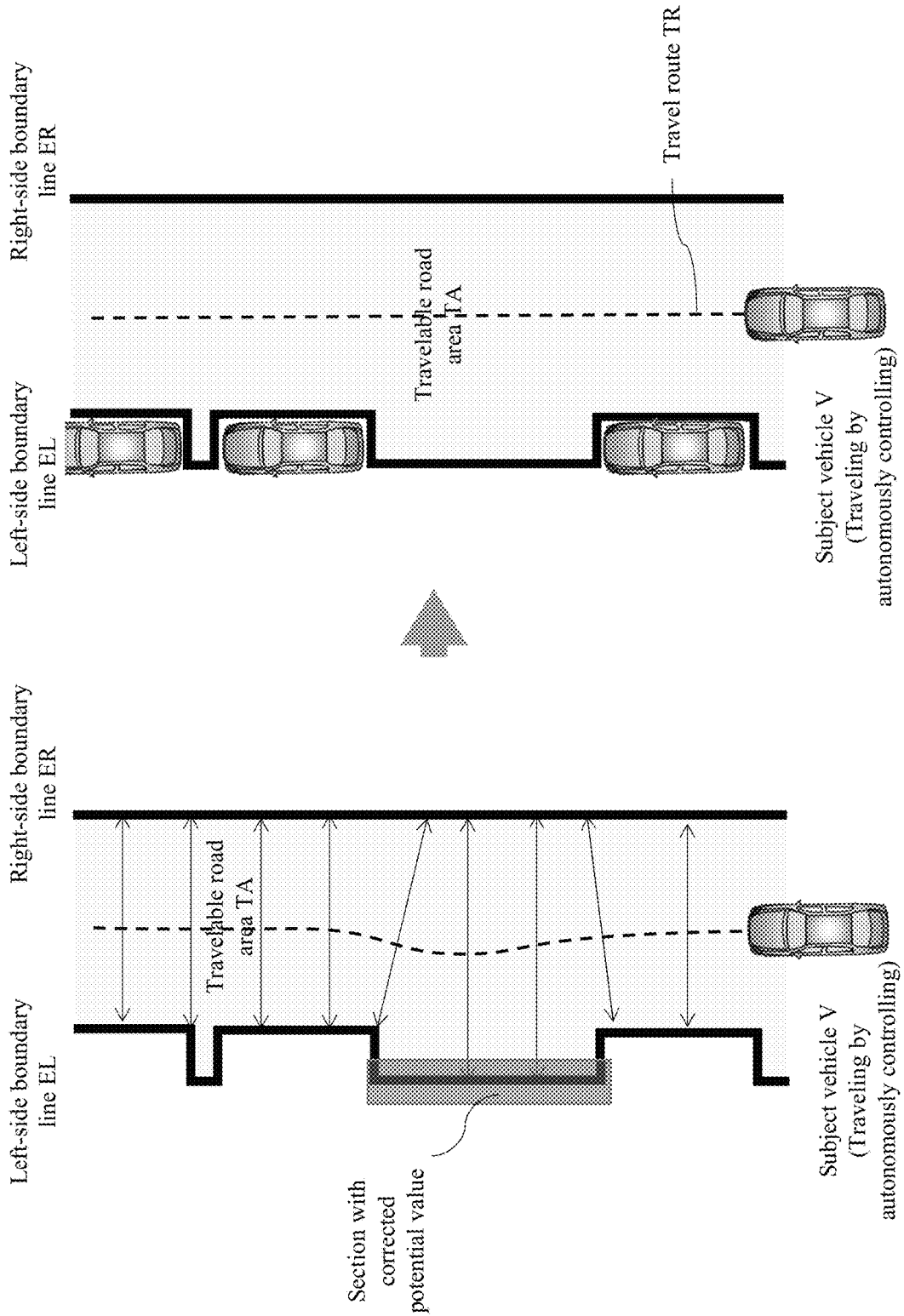

VEHICLE TRAVEL CONTROL METHOD AND TRAVEL CONTROL DEVICE

TECHNICAL FIELD

The present invention relates to a travel control method and a travel control device for a vehicle.

BACKGROUND

As a device used for autonomous travel control a vehicle or the like, a travel route generation device is known to generate a travel route of a vehicle using a Support Vector Machine. The travel route generation device acquires surrounding information of a subject vehicle and traveling status of the subject vehicle, and recognizes a travelable region and a non-travelable region of the subject vehicle from road widths, road shapes, and obstacles obtained on the basis of the surrounding information. Then, in the recognized travelable region, the travel route generation device sets a curvature of the travel route based on vehicle speed of the subject vehicle and target lateral acceleration of the subject vehicle. From this curvature, a coefficient of the Radial Basis Function used as the Kernel Function on the Support Vector Machine is set as a curvature parameter. Then, the Support Vector Machine of the travel route generation device generates the travel route of the subject vehicle based on the set curvature parameter (JP2015-16799 A).

SUMMARY

In above prior art, the Support Vector Machine of the travel route generation device sets a feature point closest to an identification plane among the feature points belonging to the left and right classes of the road as a Support Vector. The identification plane is generated so that the distance between the Support Vector and the identification plane is maximized, and this is set as the travel route. In other words, the travel route is approximately the center of the right and left width directions of the road area recognized as the travelable area. Thus, for example, if there are obstacles only on the left side of a relatively wide road, such as parked vehicles scattered on the left side of the road, the travel route is generated to pass through the center of road only to the extent that there are no obstacles. Therefore, a wavy travel route is generated and may cause discomfort to occupants.

A problem to be solved by the present invention is to provide a travel control method and a travel control device for a vehicle capable of realizing smooth autonomous travel control by eliminating the discomfort of occupants.

The present invention solves the above problem by, detecting a travelable road area of the road area in which a subject vehicle can travel; generating a potential field in a space of the travelable road area in which a potential value of the left-side boundary line and a potential value of the right-side boundary line are set to different values from each other; calculating a travelable road area width by applying the Potential Method; comparing a lateral position of a travel route set on the basis of the calculated travelable road area width with a lateral position of the travel route set in advance in the travelable road area on the basis of the left-side boundary line or the right-side boundary line; correcting the potential value if there is a difference between above two lateral positions; regenerating the potential field set to the corrected potential value; generating the travel route by applying the Potential Method to the regenerated potential field; and executing autonomous travel control of the subject vehicle according to the generated travel route.

According to the present invention, since the travel route is generated in accordance with the lateral position of the travel route set in advance, it is possible to realize the smooth autonomous travel control by eliminating the discomfort of the occupants.

BRIEF DESCRIPTION OF THE DRAWINGS

FIG. 4 is a flowchart illustrating a processing procedure executed by the travel control device for a vehicle illustrated in FIG. 1;

FIG. 10 is a diagram illustrating an example of a control map stored in a lateral position instruction unit illustrated in FIG. 1;

FIG. 11 is a diagram illustrating the potential field and the equipotential lines for explaining the process in step S12 illustrated in FIG. 4;

FIG. 15 is a plan view (Part 2) for explaining a process executed by using the travel control device for a vehicle of the present invention regarding the scene of FIG. 13; and FIG. 16 is a plan view (Part 3) for explaining a process executed by using the travel control device for a vehicle of the present invention regarding the scene of FIG. 13.

DETAILED DESCRIPTION

Figure 1:
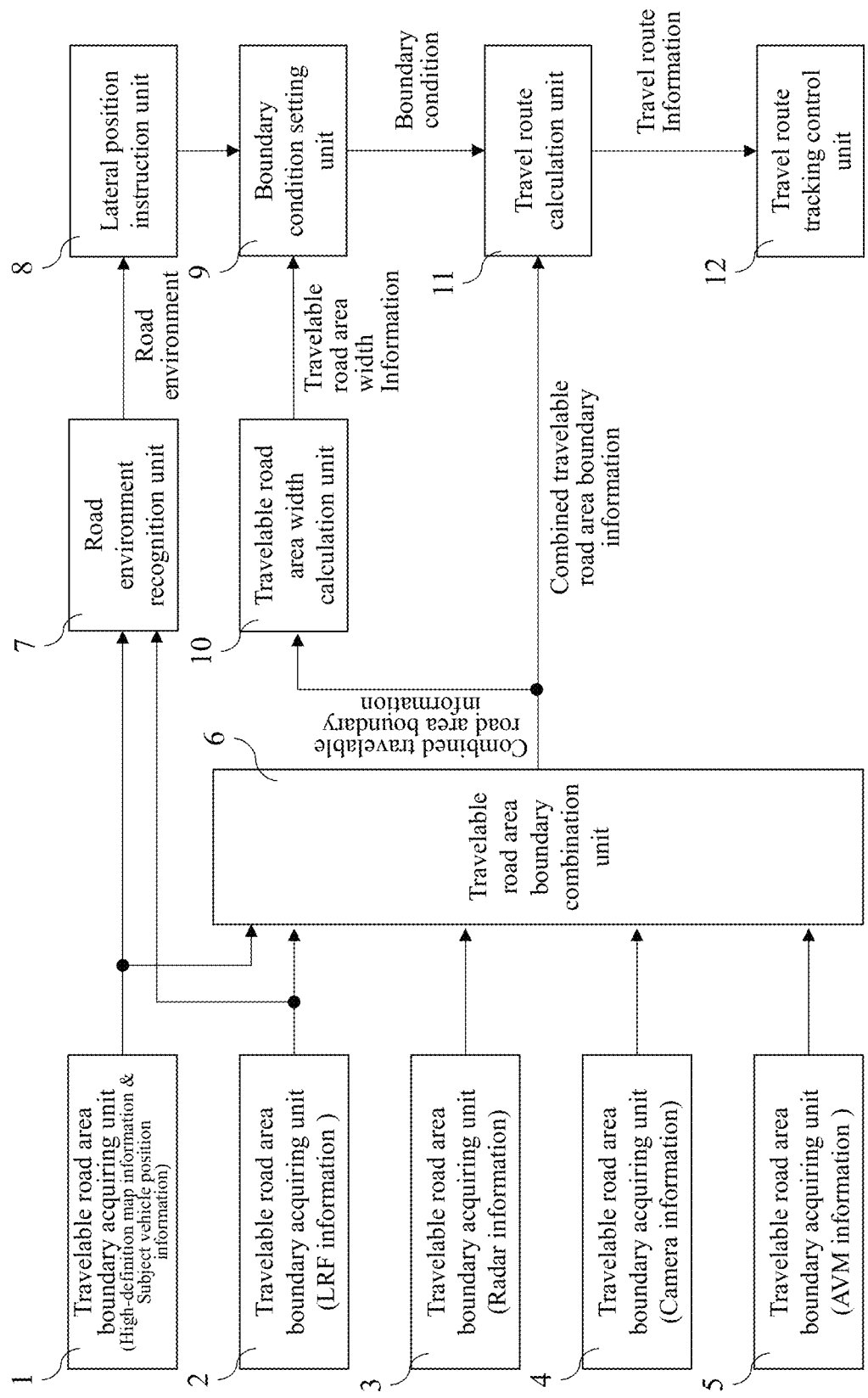
FIG. 1 is a block diagram illustrating an embodiment of a travel control device for a vehicle of the present invention.

FIG. 1 is a block diagram illustrating a configuration of a travel control device VTC (Vehicle Travel Controller) for a vehicle according to the present embodiment. The travel control device VTC for a vehicle of the present embodiment is also an embodiment for performing a travel control method for a vehicle according to the present invention. As illustrated in FIG. 1, the travel control device VTC for a vehicle according to the present embodiment comprises travelable road area boundary acquiring units 1-5, a travelable road area boundary combination unit 6, a road environment recognition unit 7, a lateral position instruction unit 8, a boundary condition setting unit 9, a travelable road area width calculation unit 10, a travel route calculation unit 11, and a travel route tracking control unit 12.

The travelable road area boundary acquiring units 1 to 5 of these units are composed of various types of sensors, as will be described later. The travelable road area boundary combination unit 6, the road environment recognition unit 7, the lateral position instruction unit 8, the boundary condition setting unit 9, the travelable road area width calculation unit 10, the travel route calculation unit 11, and the travel route tracking control unit 12 are configured by one or more computers and software installed in the computer. The computer comprises a ROM storing programs for functioning the respective units, such as the travelable road area boundary combination unit 6, the road environment recognition unit 7, the lateral position instruction unit 8, the boundary condition setting unit 9, the travelable road area width calculation unit 10, the travel route calculation unit 11, and the travel route tracking control unit 12, a CPU executing the programs stored in the ROM, and a RAM functioning as an accessible storage device. In addition, as the operation circuits, an MPU, a DSP, an ASIC, an FPGA, and the like can be used instead of or together with the CPU.

The travelable road area boundary acquiring units 1 to 5 detect various types of information for acquiring left-side travelable road area boundary information regarding a left-side boundary line and right-side travelable road area boundary information regarding a right-side boundary line of a travelable road area TA of a subject vehicle V to be controlled by autonomous travel control.

The travelable road area boundary acquiring unit 1 acquires subject vehicle position information by the subject vehicle position detecting device mounted on the subject vehicle and three-dimensional high-definition map information stored in the map data base, and outputs these pieces of information to the travelable road area boundary combination unit 6 and the road environment recognition unit 7. This subject vehicle position detecting device is composed of a GPS unit, a gyro sensor, and a vehicle speed sensor, etc., and detects radio waves transmitted from multiple satellite communications by a GPS unit, acquires position information of the subject vehicle periodically, and detects current position information of the subject vehicle based on the acquired position information of the subject vehicle, angle-change information acquired from the gyro sensor, and vehicle speed acquired from the vehicle speed sensor. The three-dimensional high-definition map information stored in the map database is three-dimensional map information based on a road shape detected when a vehicle for data acquisition is used to travel on an actual road. And, the three-dimensional high-definition map information is map information in which, together with map information, detailed and high-definition position information such as merge points of the roads, branching points, tollgates, the positions at which the number of lanes decrease, service area (SA)/parking area (PA), etc. are related as three-dimensional information.

The travelable road area boundary acquiring unit 2 acquires obstacle information (LRF information) by Laser rangefinder (LRF) provided at the front of the vehicle, and outputs the obstacle information to the travelable road area boundary combination unit 6 and the road environment recognition unit 7. The Laser rangefinder irradiates a laser beam, which is an output wave for measuring distance, to ahead of the vehicle, and detects a reflected wave (detection wave) to generate a distance measuring signal indicating the relative position between a signpost around the vehicle and the vehicle. The signposts are, for example, other vehicles on the traveling road on which the vehicle travels, two-wheel vehicles, bicycles, pedestrians, lane dividing lines on the traveling road surface, curbs of the road shoulders, guardrails, walls, embankments, and the like.

The travelable road area boundary acquiring unit 3 acquires obstacle information (radar information) by a radar device using millimeter waves or ultrasonic waves and outputs the obstacle information to the travelable road area boundary combination unit 6. The radar device scans a predetermined area around the subject vehicle by irradiating millimeter waves or ultrasonic waves ahead of the vehicle, and detects obstacles such as other vehicles, the two-wheel vehicles, the bicycles, the pedestrians, the curbstones of the road shoulders, the guardrails, the walls, the embankments, etc. that exist around the subject vehicle. For example, the radar device detects a relative position (direction) between the obstacles and the subject vehicle, a relative speed of the obstacles, and a distance from the subject vehicle to the obstacles or the like as surrounding situations of the subject vehicle.

The travelable road area boundary acquiring unit 4 acquires obstacle information (camera information) by a camera provided at the front of the vehicle or the like, and outputs the obstacle information to the travelable road area boundary combination unit 6. The camera is an image sensor for acquiring image data by imaging a predetermined area ahead of the subject vehicle, for example, a CCD wide-angle camera provided at the upper part of the front windshield in the vehicle interior. The camera may be a stereo camera or an omnidirectional camera, and may include a plurality of image sensors. From the acquired image data, the camera detects the road existing ahead of the subject vehicle and structures around the road, traffic signs, signs, other vehicles, two-wheel vehicles, bicycles, pedestrians or the like as surrounding situations of the subject vehicle.

The travelable road area boundary acquiring unit 5 acquires obstacle information (Around View Monitor AVM information) from cameras provided all around the front, rear, and side of the vehicle, and outputs the obstacle information to the travelable road area boundary combination unit 6. Each camera is an image sensor for acquiring image data by imaging an area of the entire periphery of the subject vehicle, for example, a CCD wide-angle camera provided at the upper part of the front windshield in the vehicle interior, left and right side mirrors, the trunk lid or the like. From the acquired image data, the camera detects the road existing around the subject vehicle and structures around the road, traffic signs, signs, other vehicles, two-wheel vehicles, bicycles, pedestrians or the like as surrounding situations of the subject vehicle.

It is not necessary to provide all of the above travelable road area boundary acquiring units 1 to 5, but at least the travelable road area boundary acquiring unit 1, and one of the travelable road area boundary acquiring unit 2 and the travelable road area boundary acquiring unit 3, and one of the travelable road area boundary acquiring unit 4 and the travelable road area boundary acquiring unit 5 may be provided. Since the travelable road area boundary acquiring unit 1 acquires the current position information of the subject vehicle and the three-dimensional high-definition map information in the vicinity thereof, it is possible to recognize road shapes other than the obstacles in the vicinity of the subject vehicle. Further, the travelable road area boundary acquiring unit 2 or the travelable road area boundary acquiring unit 3 is possible to recognize the presence or absence of relatively distant obstacles because it scans by using a laser beam or the like. In contrast, the travelable road area boundary acquiring unit 4 or the travelable road area boundary acquiring unit 5 is possible to recognize not only the presence or absence of the obstacles but also their types because it images by using an image sensor or the like.

The travelable road area boundary combination unit 6 generates the left-side travelable road area boundary information regarding the left-side boundary line of the travelable road area in which the subject vehicle can travel and the right-side travelable road area boundary information regarding the right-side boundary line of the travelable road area, based on the information acquired by the travelable road area boundary acquiring units 1 to 5. That is, the travelable road area boundary combination unit 6 detects a first travelable road area boundary information in a horizontal plane of the road area in which the subject vehicle can travel. The first travelable road area boundary information is detected based on the current position information of the subject vehicle acquired by the travelable road area boundary acquiring unit 1 and the map information in which road boundary information is defined. At the same time, the travelable road area boundary combination unit 6 acquires the objects around the subject vehicle and the road situations acquired by the travelable road area boundary acquiring units 2 to 5 as the surrounding information. Then, the travelable road area boundary combination unit 6 detects second travelable road area boundary information in a horizontal plane of the road area in which the subject vehicle can travel based on the surrounding information.

Incidentally, in the present specification, the term "road" means the road itself which actually exists regardless of the presence or absence of the obstacles and which is arranged to be passed by vehicles or people, and which is included in the map information. On the other hand, in the present specification, the term "travelable road area" means the road area in which the subject vehicle can travel, that is, the travelable road area in which the subject vehicle can travel excluding the obstacles. Thus, the travelable road area boundary combination unit 6 detects the first travelable road area boundary information regarding the "road" acquired by the travelable road area boundary acquiring unit 1, while it detects the second travelable road area boundary information regarding the "travelable road area" acquired by the travelable road area boundary acquiring units 2 to 5. Then, the travelable road area boundary combination unit 6 combines or integrates the first travelable road area boundary information and the second travelable road area boundary information to generate combined travelable road area boundary information, and further divides the combined travelable road area boundary information to the left-side travelable road area boundary information and the right-side travelable road area boundary information. Additionally, in this specification, the terms "left side", "right side" and "lateral direction" mean the left side, the right side and the lateral direction when the traveling direction of the subject vehicle is forward.

Figure 13:
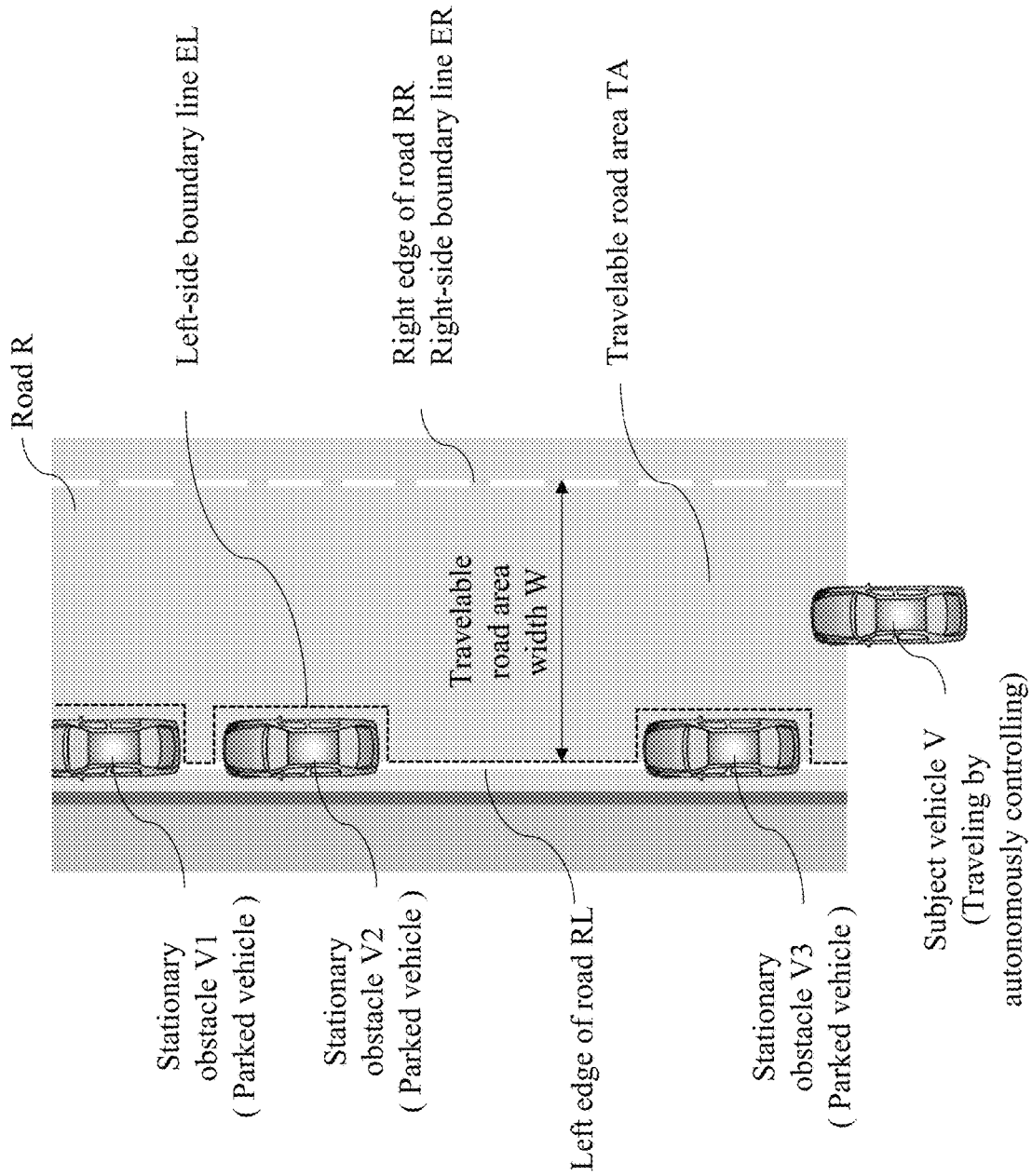
FIG. 13 is a plan view illustrating an example of a precondition scene of the travel route generated by using the travel control device for a vehicle of the present invention.

FIG. 13 is a plan view illustrating an example of the road on which the subject vehicle V travels. FIG. 13 illustrates one lane on the left in a country with traffic laws and regulations for left-hand traffic, such as Japan or the United Kingdom. In this case, the travelable road area boundary combination unit 6 acquires the current position of the subject vehicle V, specifically latitude/longitude information, from the GPS unit by the travelable road area boundary acquiring unit 1. In addition, the travelable road area boundary combination unit 6 acquires the surrounding road information in which the subject vehicle V exists from the three-dimensional high-definition map information, specifically, the environment or attribute of the road R (national information, location information of the road left edge RL, location information of the road right edge RR, width of the road R, highway/general road type, etc.). At the same time, the travelable road area boundary combination unit 6 acquires the location of the obstacles such as other vehicles, the two-wheel vehicles, the bicycles, the pedestrians, the curbs of the road shoulders, the guardrails, the walls, embankments, etc. that exist around the subject vehicle V by the travelable road area boundary acquiring units 2 to 5.

Figure 5:
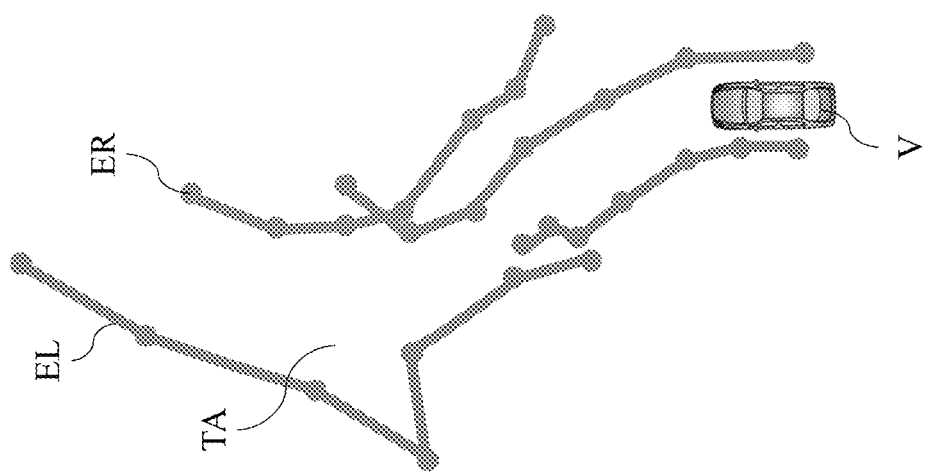
FIG. 5 is a plan view of a travelable road area for explaining the processes in steps S1 to S4 illustrated in FIG. 4.

Then, the travelable road area boundary combination unit 6 subtracts the presence area of the obstacles recognized from the position information of the obstacles acquired by the travelable road area boundary acquiring units 2 to 5 from the area of the road R recognized from the current position information of the subject vehicle V acquired by the travelable road area boundary acquiring unit 1 and the three-dimensional high-definition map information on its surroundings, and calculates the travelable road area TA in which the subject vehicle V can travel. Then, the travelable road area boundary combination unit 6 calculates the left-side travelable road area boundary information indicating the left-side boundary line EL and the right-side travelable road area boundary information indicating the right-side boundary line ER on the basis of the area information of the travelable road area TA calculated in this way. As for the scene illustrated in FIG. 13, since the travelable road area boundary acquiring units 2 to 5 acquire the presence of three stationary obstacles (parked vehicles) V1, V2, and V3 on the left side of the road R, the left-side boundary line EL is the line illustrated by the dotted line. On the other hand, since there are no obstacles on the right side of the road R, the right-side boundary line ER is the same line as the right edge RR of the road. The travelable road area boundary combination unit 6 converts each of the left-side travelable road area boundary information regarding the left-side boundary line EL and the right-side travelable road area boundary information regarding the right-side boundary line ER into a set of sequential straight lines information and stores the set of sequential straight lines information. Therefore, even for the relatively simple road shapes illustrated in FIG. 13, even the complex road shapes shown in FIG. 5 are converted into the set of sequential straight lines information and stored as illustrated in FIG. 5.

Referring back to FIG. 1, a road environment recognition unit 7 recognizes the road environment or the like in which the subject vehicle V is currently traveling on the basis of current position information of the subject vehicle V acquired by the travelable road area boundary acquiring unit 1, the three-dimensional high-definition map information on its surroundings and the position information of the obstacles acquired by the travelable road area boundary acquiring unit 2. Specifically, as illustrated in FIG. 10, the road environment recognition unit 7 recognizes whether or not there are a lot of parked vehicles on either the left or right side of the road R as the road environment. The road environment recognition unit 7 also recognizes national information such as whether traffic laws and regulations of vehicles is left-side travel or right-side travel. In addition, the road environment recognition unit 7 recognizes a frequency of left-side travelable road area boundary information of left-side boundary line EL and a frequency of right-side travelable road area boundary information of right-side boundary line ER. FIG. 10 is a diagram illustrating an example of a control map stored in the lateral position instruction unit 8 illustrated in FIG. 1.

The lateral position instruction unit 8 is a unit in which lateral positions of travelable road area TA suitable for the subject vehicle V to travel are set in advance according to the road environment. For example, in Japan, the width of passenger car is 1.4 to 2.5 m, while the width of the road R in one lane is specified to be around 3.5 m. However, in some countries, including Japan, there are roads as wide as around 5 to 6 m, and parking is often permitted in the side of the road. Therefore, in the lateral position instruction unit 8 of the present embodiment, the fact that parking is not prohibited is acquired by the three-dimensional high-definition map information of the travelable road area boundary acquiring unit 1, and the fact whether or not parked vehicles actually exist are acquired by the LRF information of the travelable road area boundary acquiring unit 2. Thus, the lateral position instruction unit 8 recognizes whether or not there are a lot of parked vehicles in the side of the road as the road environment. In addition, the lateral position instruction unit 8 acquires national information during the traveling of the subject vehicle V by the three-dimensional high-definition map information of the travelable road area boundary acquiring unit 1, and recognizes whether it is left-side travel or right-side travel. Furthermore, as other conditions, the lateral position instruction unit 8 acquires the frequency of the left-side travelable road area boundary information of the left-side boundary line EL and the frequency of the right-side travelable road area boundary information of the right-side boundary line ER, which are acquired by the travelable road area boundary combination unit 6, and recognizes which of the left-side boundary line EL and the right-side boundary line ER has more obstacles. Incidentally, the frequency of the left-side travelable road area boundary information and the frequency of the right-side travelable road area boundary information means the frequency of the lateral direction zigzag lines regarding the traveling direction of the road R (the vertical direction of FIG. 13) in the left-side boundary line EL illustrated in FIG. 13. This means the frequency of the left-side boundary line EL and the frequency of the right-side boundary line ER when the lateral change is taken as the amplitude, and is the frequency of the lateral change per unit distance in the direction along the road R. A higher frequency means more obstacles, while a lower frequency means fewer obstacles.

Then, the lateral position instruction unit 8 outputs a command on the basis of the road environment, the national information and the other conditions recognized by the road environment recognition unit 7 and the control map illustrated in FIG. 10 stored in the lateral position instruction unit 8. When there are many parked vehicles in the side of the road as the road environment, and the country is recognized as the left-side travel by the national information, the lateral position instruction unit 8 outputs a command to execute the autonomous travel control while setting the width center of the subject vehicle V at the position of 1.5 m from the right edge of the travelable road area TA to the left direction. When there are many parked vehicles in the side of the road as the road environment, and the country is recognized as the right-side travel by the national information, the lateral position instruction unit 8 outputs the command to execute the autonomous travel control while setting the width center of the subject vehicle V at the position of 1.5 m from the left edge of the travelable road area TA to the right direction. Similarly, when there are many parked vehicles in the side of the road as the road environment, and the national information cannot acquired, the lateral position instruction unit 8 acquires the frequency of the left-side travelable road area boundary information of the left-side boundary line EL and the frequency of the right-side travelable road area boundary information of the right-side boundary line ER, which are acquired by the travelable road area boundary combination unit 6. Then, when the frequency of the left-side travelable road area boundary information is smaller, the lateral position instruction unit 8 outputs the command to execute the autonomous travel control while setting the width center of the subject vehicle V at the position of 1.5 m from the left edge of the travelable road area TA to the right direction. When the frequency of the right-side travelable road area boundary information is smaller, the lateral position instruction unit 8 outputs the command to execute the autonomous travel control while setting the width center of the subject vehicle V at the position of 1.5 m from the right edge of the travelable road area TA to the left direction. Incidentally, when there are not many parked vehicles in the side of the road as the road environment, the lateral position instruction unit 8 outputs the command to execute the autonomous travel control so that the center position of the travelable road area TA coincides with the width center of the subject vehicle V.

Figure 2:
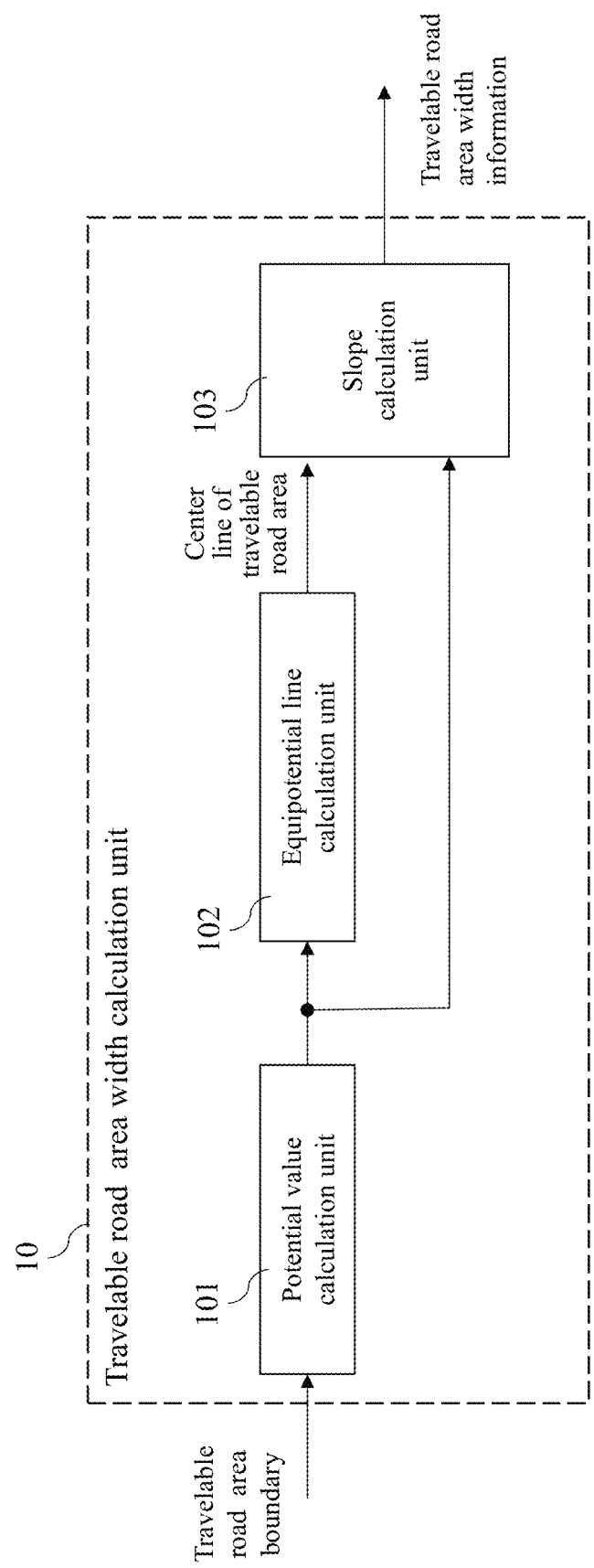
FIG. 2 is a block diagram illustrating a configuration of a travelable road area width calculation unit illustrated in FIG. 1.

Referring to FIG. 1, the travelable road area width calculation unit 10 acquires the combined travelable road area boundary information calculated by the travelable road area boundary combination unit 6 (including the left-side travelable road area boundary information and the right-side travelable road area boundary information), and calculates a travelable road area width W of the travelable road area TA ahead of the subject vehicle V. FIG. 2 is a block diagram illustrating a specific configuration of the travelable road area width calculation unit 10 illustrated in FIG. 1. FIG. 5 is a plan view illustrating the combined travelable road area boundary information (including the left-side travelable road area boundary information and the right-side travelable road area boundary information) calculated by the travelable road area boundary combination unit 6.

The travelable road area width calculation unit 10 comprises a potential value calculation unit 101, an equipotential line calculation unit 102, and a slope calculation unit 103, as illustrated in FIG. 2. The travelable road area width calculation unit 10 reads each of the left-side travelable road area boundary information regarding to the left-side boundary line EL and the right-side travelable road area boundary information regarding to the right-side boundary line ER, calculates the travelable road area width W at predetermined intervals with respect to the traveling direction of the subject vehicle V, and outputs the travelable road area width W to the boundary condition setting unit 9.

Figure 6:
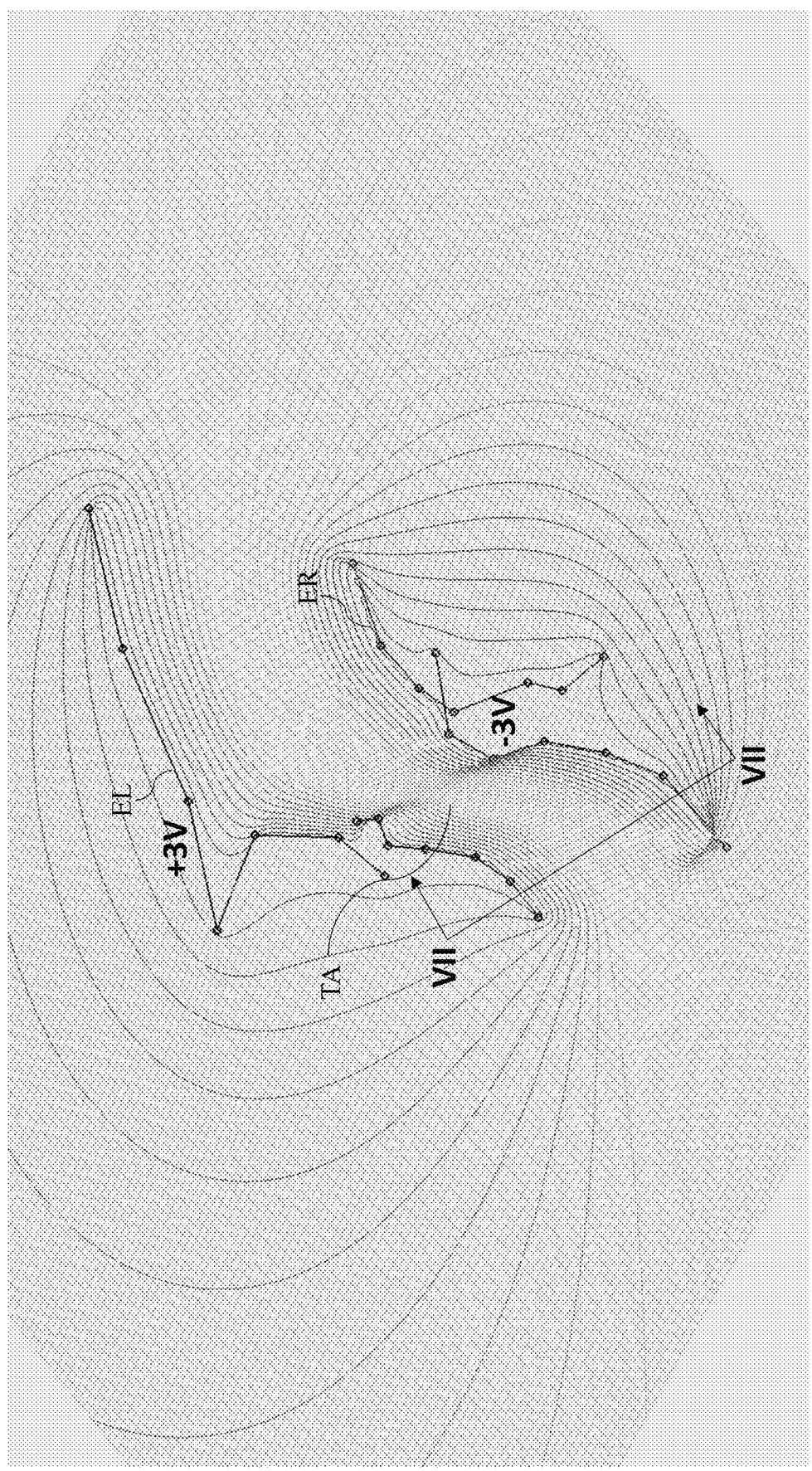
FIG. 6 is a diagram illustrating a potential field and equipotential lines for explaining the processes in steps S5 to S6 illustrated in FIG. 4.

FIG. 6 is a diagram illustrating the result of calculating the potential value of the potential field using the Substitute Charge Method (also referred to as the Charge Superposition Method). The potential field in which the left-side boundary line EL of left-side travelable road area boundary information is a first potential value (+3V in the example illustrated in FIG. 6), and the right-side boundary line ER of the right-side travelable road area boundary information is a second potential value (−3V in the example illustrated in FIG. 6) different from the first potential value (+3V), is generated in the two-dimensional space (x-y plane) of the travelable road area TA. There is the travelable road area TA between the left-side boundary line EL indicated by the set of sequential straight lines and the right-side boundary line ER indicated by the set of sequential straight lines as well. The Substitute Charge Method is applied to the two-dimensional space in which the travelable road area TA exists by using computer simulation. Then, the equipotential electric charge lines (equipotential lines) of the electric field when the voltage of +3V is applied to the left-side boundary line EL and the voltage of −3V is applied to the right-side boundary line ER are illustrated. That is, FIG. 6 indicates the result of calculating the potential value, which is the solution of Laplace's Equation in the two-dimensional space of the travelable road area TA formed between the left-side boundary line EL and the right-side boundary line ER, using the Substitute Charge Method.

Figure 7:
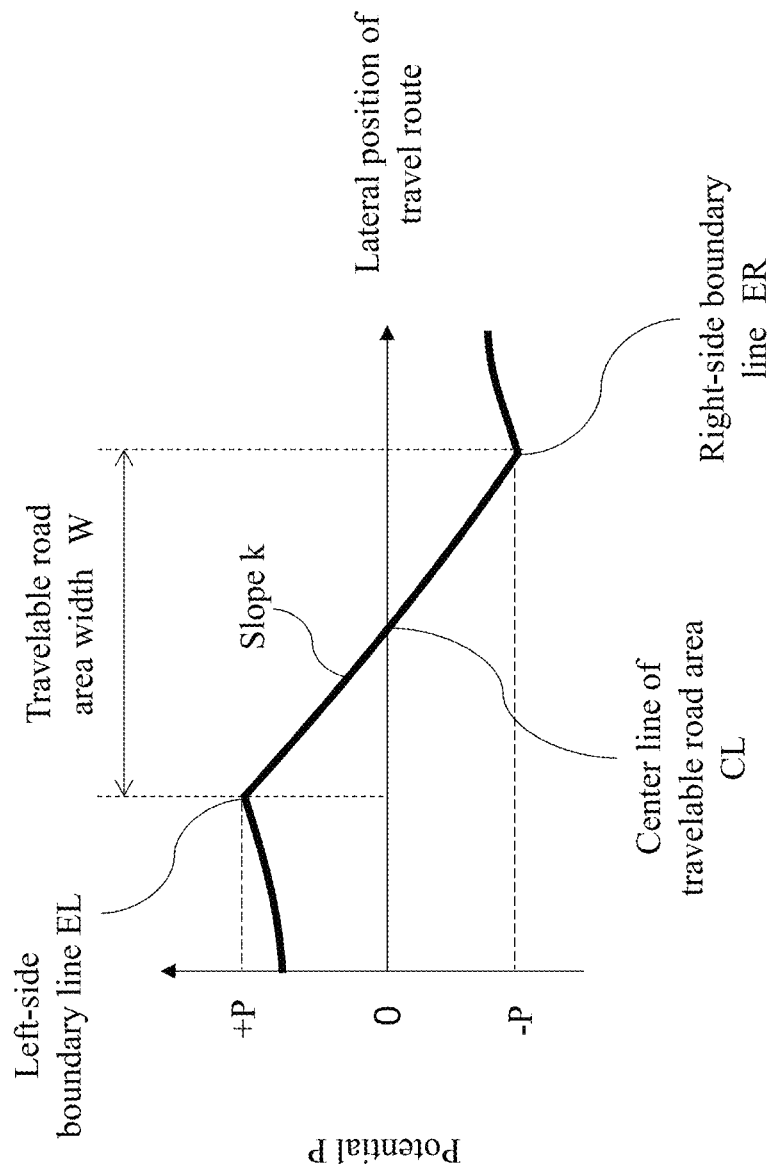
FIG. 7 is a graph illustrating a potential value at a cross section along VII-VII line illustrated in FIG. 6 for explaining the process in step S7 illustrated in FIG. 4.

FIG. 7 is a graph illustrating the potential value (the electric charge) at a cross section along VII-VII line of travelable road area TA illustrated in FIG. 6. The potential value "+P" on the vertical axis in FIG. 7 corresponds to the +3V in FIG. 6, and the potential value "−P" on the vertical axis in FIG. 7 corresponds to the −3V in FIG. 6. Then, in FIG. 7, it has been confirmed by the present inventors that the slope k of the potential value from the left-side boundary line EL to the right-side boundary line ER is substantially constant. Therefore, wherein the potential value is P, the travelable road area width is W and the slope is k, an equation kW=2P is realized from the graph of FIG. 7, it is possible to calculate the travelable road area width W based on the equation W=2P/k.

Here, the Laplace's Equation is a differential equation that solves the potential field of a stationary state in nature (a state that does not change with time, that is, a state in which there is no time-varying variable). The Laplace's Equation includes, for example, an electrostatic potential in a uniform medium with no charge distribution as illustrated in FIG. 6, a diffusion equation for thermal conduction with respect to the temperature distribution in the solid contacting the heat source, and an equation for solving the gravitational potential in the gravitational field. Specifically, the equation is $(\partial^2 E/\partial x^2)+(\partial^2 E/\partial y^2)=0$ for the quadratic function E in the two-dimensional space (x, y) of the travelable road area TA as in the present embodiment.

Moreover, when calculating the solution to this Laplace's Equation, it can be calculated by using a function that can satisfy second-order continuous differentiation of the Laplace's Equation (hereinafter referred to as harmonic function). That is, for the quadratic function E in the two-dimensional space (x, y) of the travelable road area TA as in the present embodiment, E=ax+by +c, E=a ln ($\sqrt{(x^2+y^2)}$) becomes the harmonic function. In the equation, a, b, and c are constants and ln is a natural logarithm. It should be noted that the harmonic function is assumed to be a function that can be differentiated by second-order continuous differentiation, but it is also a function that can be differentiated infinitely. Here, for the two-dimensional space (x, y) of the travelable road area TA as in the present embodiment, there is a pair of next harmonic functions E, F satisfying the equation of $(\partial E/\partial x)(\partial F/\partial x)+(\partial E/\partial y)(\partial F/\partial y)=0$. The complex function G(x, y)=E(x, y)+iF(x, y) obtained by using the paired functions E and F is a kind of the harmonic function that satisfies the Laplace's Equation. It is called regular analytic function and has the feature which is convenient for calculation.

The potential value calculation unit 101, illustrated in FIG. 2, applies the Substitute Charge Method to the two-dimensional space (x-y plane) of the travelable road area TA and finds the solution of the Laplace's Equation for the electric field. Specifically, the potential value calculation unit 101 uses a harmonic function as a basis function, which is defined by the position, the direction and the length of each line segment of sequential straight lines information of the left-side travelable road area boundary information and the right-side travelable road area boundary information, and uses an approximate solution of these linear combinations. Here, the potential value calculation unit 101 selects the middle point of each line segment of the sequential straight lines information as the place in which the Dirichlet Conditions is applied, and applies the Substitute Charge Method to obtain the linear combinations coefficient. More specifically, while the two-dimensional space (x-y plane) of the travelable road area TA is used as a complex plane, the travelable road area boundary information is converted into complex number information, and the basis function is a complex regular analytic function. By using the complex potential as the approximate solution of these linear combinations, it is possible to obtain the electric charge (potential value) at all or a part of the position in the two-dimensional space (x-y plane). The complex regular analytic function as the basis function is defined by f(z)=ln(z1−z)+ln{(z1−z)/(z0−z)} (z0−z)/(z1−z0), wherein z is as a complex variable. Thus, when the travelable road area TA which is the object of the potential field is set as the complex plane, and the left boundary information of the left-side boundary line EL and the right boundary information of the right-side boundary line ER are converted into the complex number information, the slope k is easily obtained. Therefore, the slope calculation unit 103, on the basis of the equation W=2P/k illustrated in FIG. 7, calculates the travelable road area width W, and outputs it to the boundary condition setting unit 9.

However, when calculating all the electric charges (potential values) in the x-y plane of the travelable road area TA by the potential value calculation unit 101, the calculation load is large, and the calculation time is also long. Therefore, the equipotential line calculation unit 102 obtains the equipotential electric charge lines (equipotential lines) by searching for a reference position at which the electric charge (potential value) is equal. For example, in the travelable road area TA illustrated in FIG. 6, the electric field with +3V applied to the left-side boundary line EL and −3V applied to the right-side boundary line ER is generated as the potential field. Therefore, the position of 0V to be the intermediate value, that is, the center point of the travelable road area TA is searched along the traveling direction of the subject vehicle V. FIG. 11 is a plan view for explaining how to search for such equipotential lines.

In the left diagram of FIG. 11, the equipotential line calculation unit 102 tentatively sets the position to be the start point of the center line of the travelable road area TA ahead of the travel position of the subject vehicle V and calculates the center point of the proper travelable road area TA by using the Newtonian method. The Newton method (also referred to as the Newton-Raphson method) is an iterative root-finding algorithm for solving an equation system by numerical calculation. The intercept between the tangent of the function at the tentatively set default $x_n$ and the potential P=0 is calculated, and this is set to $x_{n+1}$. Then, the intercept between the tangent of the function at the value $x_{n+1}$ and the potential P=0 is calculated and this is set to $x_{n+2}$. The Newtonian method is an algorithm for determining the start point position TR0 of the center point of proper travelable road area TA by repeating this algorithm.

The equipotential line calculation unit 102 calculates the proper start position TR0 of the center line of the travelable road area TA by the Newtonian method described above, and then, as illustrated in the right diagram of FIG. 11, calculates the center point of the travelable road area TA at the position TR1, which is a predetermined distance ahead of the travel position of the subject vehicle V, by using the fourth-order Runge-Kutta method (RK4). Here, the fourth-order Runge-Kutta method (RK4) is a numerical method to solve the initial-value-known differential equation using the fourth-order term developed by Taylor. For example, when the function is f (x, y)=dy/dx and the default values are x=0, y=0, the fourth-order Taylor expansion of y(x0+h) at position x0+h ahead by predetermined distance h is y(x0+h) =y0+hf(x0,y0)+hf(x0+h/2,y0+k½)+hf(x0+h/2, y0+k2/2)+hf (x0+h, y0+k3). In the equation, k1=hf (x0, y0), k2=hf (x0+h/2, y0+k½), k3=hf (x0+h/2, y0+k2/2), k4=h f (x0+h, y0+k3), and k=(k1+2k2+2k3+k4)/6 are applied. The equipotential line calculation unit 102 repeats this process to calculate the center point of the travelable road area TA at the position TRn ahead of the travelable road area TA as indicated in the right diagram of FIG. 11. Then, the equipotential line calculation unit 102 combines these center points to form the center line CL of the travelable road area TA, and outputs it to the slope calculation unit 103. The slope calculation unit 103, together with the travelable road area width W calculated above, holds the information of center line CL of the travelable road area TA, and outputs them to the boundary condition setting unit 9.

Figure 8:
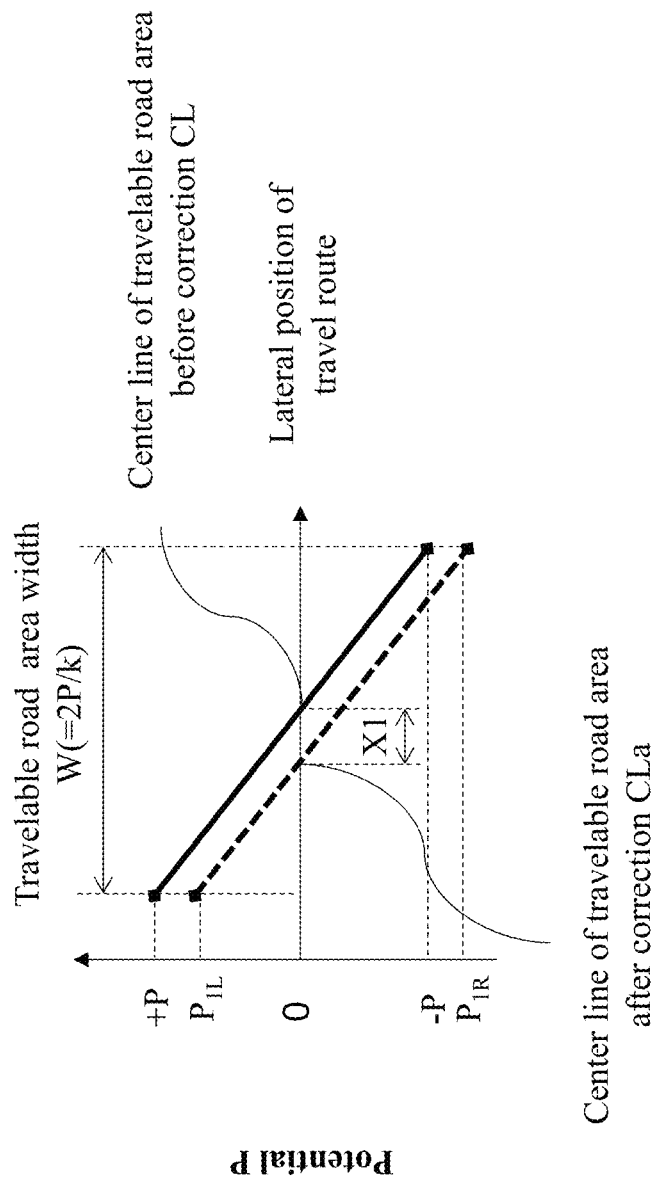
FIG. 8 is a graph illustrating the potential value at a cross section along VII-VII line illustrated in FIG. 6 for explaining the processes in steps S8 to S10 illustrated in FIG. 4.
Figure 9:
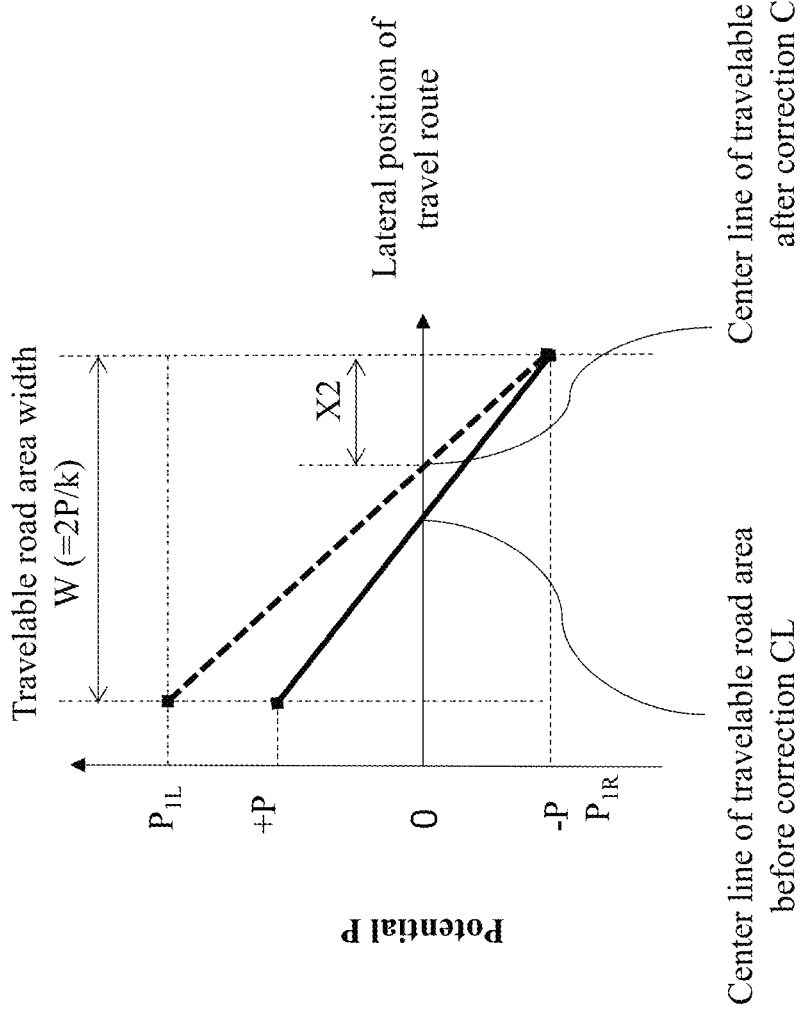
FIG. 9 is a graph illustrating the potential value at a cross section along VII-VII line illustrated in FIG. 6 for explaining another example of processes in steps S8 to S10 illustrated in FIG. 4.

Referring to FIG. 1, the boundary condition setting unit 9 sets the boundary condition on the basis of the travelable road area width W and the center line CL of the travelable road area TA acquired from the travelable road area width calculation unit 10, and the lateral position acquired from the lateral position instruction unit 8. FIGS. 8 and 9 are graphs illustrating the potential value at a cross section along VII-VII line illustrated in FIG. 6. The graphs indicate the potential value including the travelable road area width W and the center line CL of the travelable road area TA acquired from the travelable road area width calculation unit 10 by a solid line, and the potential value with respect to the lateral position acquired from the lateral position instruction unit 8 by a dotted line.

That is, in the scene illustrated in FIG. 8, the potential value of the left-side boundary line EL indicated by the solid line is +P, the potential value of the right-side boundary line ER is −P, the center line of the travelable road area TA is CL. In contrast, the command from the lateral position instruction unit 8 indicates the position offset by X1 (m) to the left direction from the center line CL of the travelable road area TA. In this example, the boundary condition setting unit 9 calculates the potential value $P_{1L}$ of the left-side boundary line EL and the potential value $-P_{1R}$ of the right-side boundary line ER which are the boundary conditions. As indicated by the dotted line, the position at which the potential value P becomes 0 is the position CLa offset by X1 to the left direction from the center line CL of the travelable road area TA. Specifically, the slope k is acquired from slope calculation unit 103 of the travelable road area width calculation unit 10 indicated by the solid line, and $P_{1L}$ and $P_{1R}$ are calculated by using the relational expressions of $P_{1L}$=+P−kX1, $P_{1R}$=−P−kX1. These potential values $P_{1L}$ and $P_{1R}$ are outputted as boundary conditions to a boundary condition correcting unit 111 of the travel route calculation unit 11 described later.

In the scene illustrated in FIG. 9, the potential value of the left-side boundary line EL indicated by the solid line is +P, the potential value of the right-side boundary line ER is −P, the center line of the travelable road area TA is CL. In contrast, the command from the lateral position instruction unit 8 indicates the position offset by X2 (m) to the left direction from the right-side boundary line ER of the travelable road area TA. In this example, the boundary condition setting unit 9 calculates the potential value $P_{1L}$ of the left-side boundary line EL and the potential value $-P_{1R}$ of the right-side boundary line ER, which are the boundary conditions. As indicated by the dotted line, the position at which the potential value P becomes 0 is the position CLa offset by X2 to the left direction from the right-side boundary line of the travelable road area TA. Specifically, the slope k is acquired from the slope calculation unit 103 of the travelable road area width calculation unit 10 indicated by the solid line, and $P_{1L}$ and $P_{1R}$ are calculated by using the relational expressions of $P_{1L}$=+P−(2P²/kX2), $P_{1R}$=−P. These potential values $P_{1L}$ and $P_{1R}$ are outputted as the boundary conditions to the boundary condition correcting unit 111 of the travel route calculation unit 11 described later.

Figure 3:
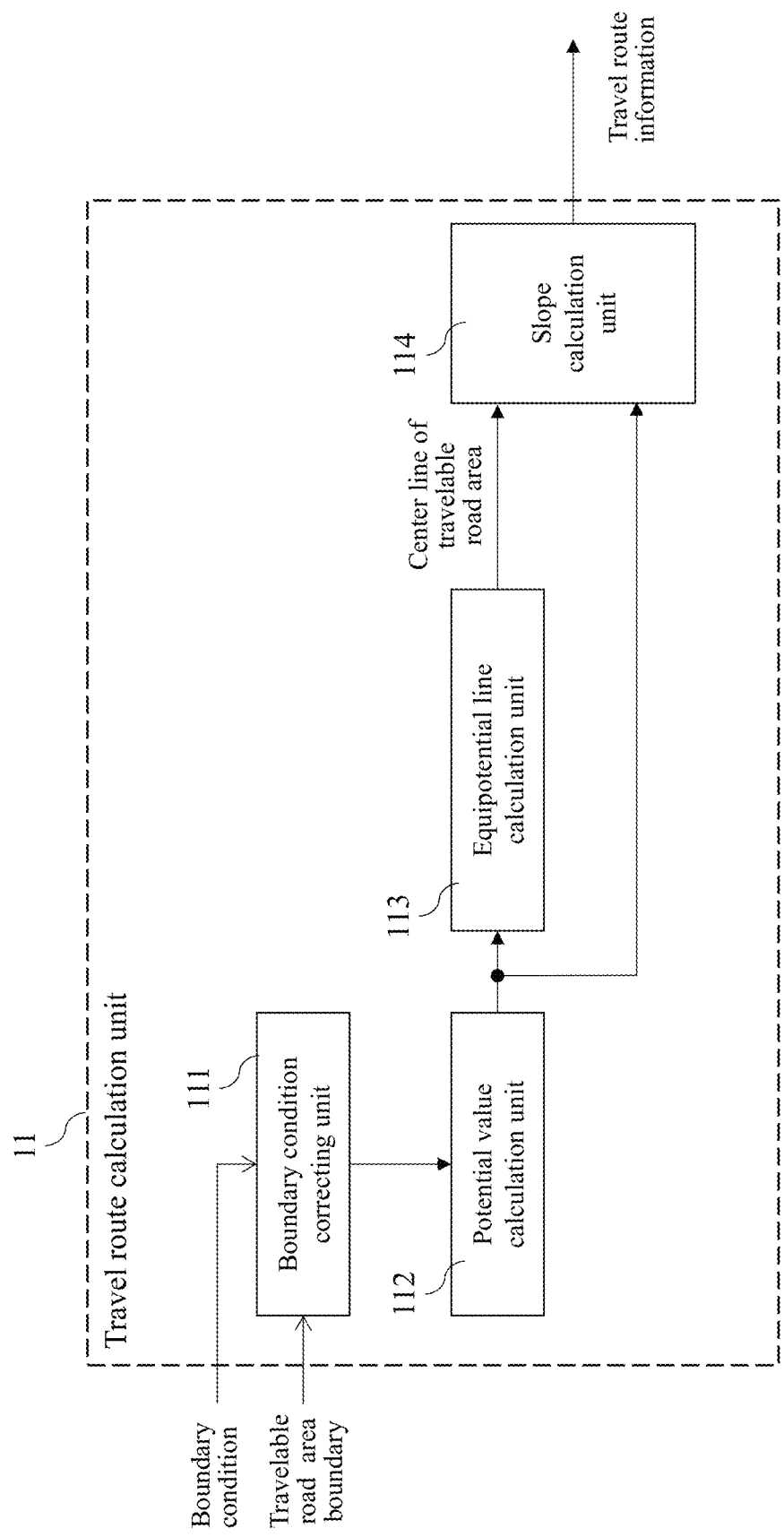
FIG. 3 is a block diagram illustrating a configuration of a travel route calculation unit illustrated in FIG. 1.
Figure 12:
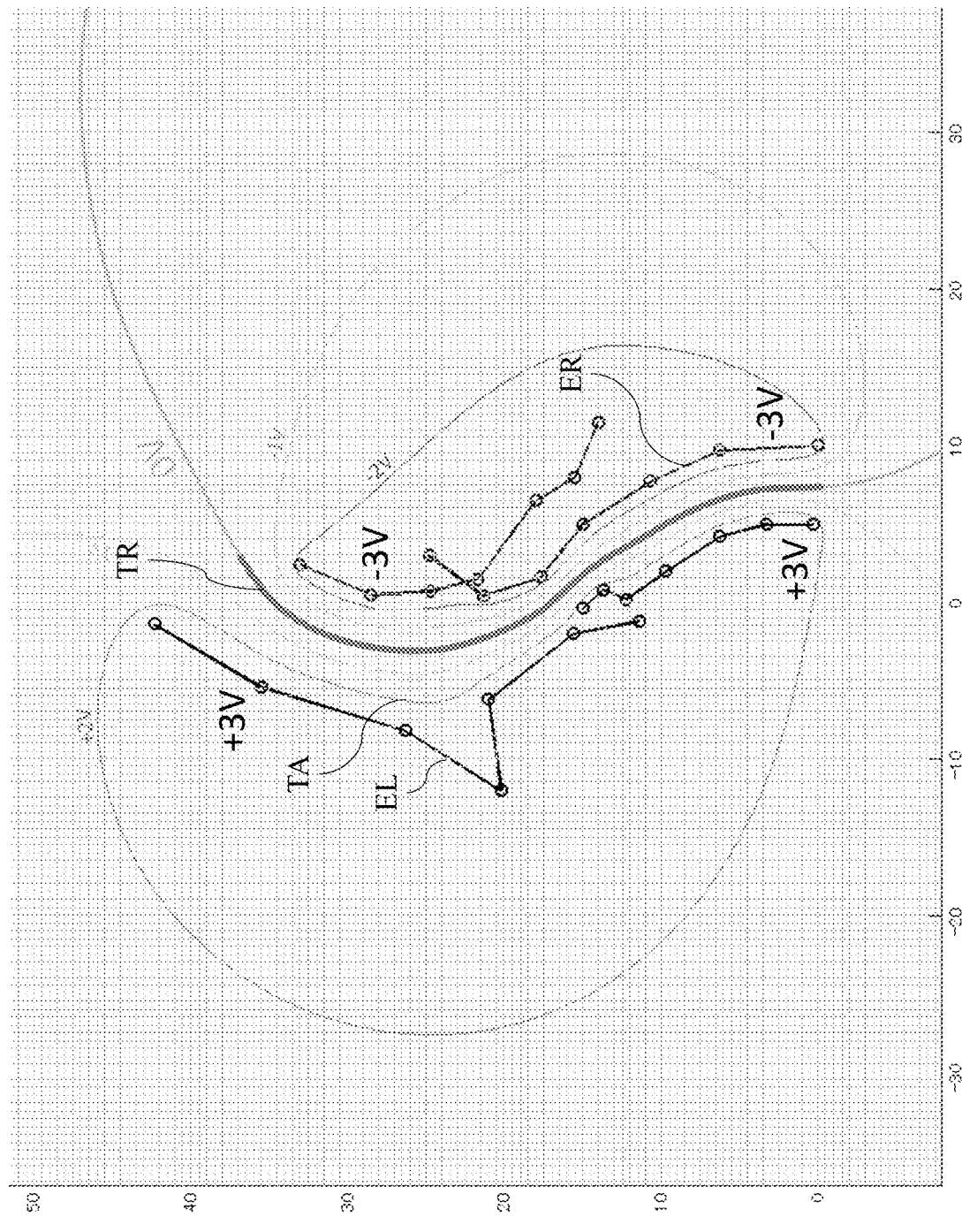
FIG. 12 is a diagram illustrating the potential field and the equipotential lines for explaining the process in step S13 illustrated in FIG. 4.

Referring to FIG. 1, the travel route calculation unit 11 calculates the travel route TR of the subject vehicle V on the basis of the combined travelable road area boundary information acquired from the travelable road area boundary combination unit 6, and the boundary conditions acquired from the boundary condition setting unit 9, and outputs it to the travel route tracking control unit 12. FIG. 3 is a block diagram illustrating the specific configuration of the travel route calculation unit 11 illustrated in FIG. 1. FIG. 12 is a plan view illustrating the travel route TR calculated by the travel route calculation unit 11. The travel route calculation unit 11, as illustrated in FIG. 3, comprises the boundary condition correcting unit 111, a potential value calculation unit 112, an equipotential line calculation unit 113, and a slope calculation unit 114.

The boundary condition correcting unit 111 corrects the potential value of the left-side boundary line EL regarding the left boundary information and the potential value of the right-side boundary line ER regarding the right boundary information, which are included in the combined travelable road area boundary information on the basis of the combined travelable road area boundary information acquired from the travelable road area boundary combination unit 6, and the boundary conditions acquired from the boundary condition setting unit 9. As indicated in FIGS. 8 and 9, the correction of the potential value is executed for a section in which a difference exists between the center line CL of the travelable road area before correction and the lateral position acquired from the lateral position instruction unit 8 (the center line CLa of the travelable road area after correction indicated by the dotted line in FIGS. 8 and 9). That is, for the section in which the boundary conditions set by the boundary condition setting unit 9, which are acquired from the travelable road area width calculation unit 10 and the lateral position instruction unit 8, differ from the potential value initially set by the potential value calculation unit 101 of the travelable road area width calculation unit 10, the relevant potential is corrected. For other sections, the potential values initially set by the potential value calculation unit 101 are used as they are.

In other words, in the section of the travelable road area TA ahead of the subject vehicle V, when the situation is as illustrated in FIG. 8, for the section, the potential value +P of the left-side boundary line EL is corrected to $P_{1L}$, and the potential value −P of the right-side boundary line ER is corrected to $-P_{1R}$. Similarly, in the section of the travelable road area TA ahead of the subject vehicle V, when the situation is as illustrated in FIG. 9, for the section, the potential value +P of the left-side boundary line EL is corrected to $P_{1L}$, and the potential value −P of the right-side boundary line ER is set to −P without being corrected.

The potential value calculation unit 112 executes the same process as the potential value calculation unit 101 of the travelable road area width calculation unit 10 illustrated in FIG. 2 except for correcting the potential value of the left-side boundary line EL and the potential value of the right-side boundary line ER regarding the right boundary information. For the two-dimensional space (x-y plane) of the travelable road area TA illustrated in FIG. 5, the potential value calculation unit 112 sets the corrected potential value $+P_{1L}$, $-P_{1R}$ for the section corrected by the boundary condition correcting unit 111, and sets the initial potential value $+P$, $-P$ for the section not corrected, as the potential value of the left-side boundary line EL and the potential value of the right-side boundary line ER, respectively. Then, the potential value calculation unit 112 uses the Substitute Charge Method (also referred to as the Charge Superposition Method) to generate the potential field in the two-dimensional space (x-y plane) of the travelable road area TA, and calculates the solution of Laplace's Equation for the electric field. Specifically, the harmonic function defined by the position, the direction, and the length of each line segment of sequential straight lines information of the left-side travelable road area boundary information and the right-side travelable road area boundary information is used as the basis function, and the approximate solution of these linear combinations is used. Here, the middle point of each line segment of the sequential straight lines information is selected as the place in which the Dirichlet Conditions is applied, and the Substitute Charge Method is applied to obtain the linear combinations coefficient. More specifically, the two-dimensional space (x-y plane) of the travelable road area TA is used as the complex plane, the travelable road area boundary information is converted into the complex number information, and the basis function is the complex regular analytic function. By using the complex potential as the approximate solution of these linear combinations, it is possible to obtain the electric charge (potential value) at all or a part of the position in the two-dimensional space (x-y plane). The complex regular analytic function as the basis function is defined by $f(z)=\ln(z1-z)+\ln\{(z1-z)/(z0-z)\}(z0-z)/(z1-z0)$, with z as the complex variable.

The equipotential line calculation unit 113 acquires the equipotential electric charge lines (equipotential lines) by searching for the reference position at which the electric charge (potential value) is equal, similar to the equipotential line calculation unit 102 of the travelable road area width calculation unit 10 illustrated in FIG. 2. For example, in the travelable road area TA illustrated in FIG. 6, the electric field with +3V or corrected potential value applied to the left-side boundary line EL and −3V or corrected potential value applied to the right-side boundary line ER is generated as the potential field. Therefore, the position of 0V to be the intermediate value, that is, the center point of the travelable road area TA is searched along the traveling direction of the subject vehicle V.

That is, in the left view of FIG. 11, the equipotential line calculation unit 113 tentatively sets the position to be the start point of the center line of the travelable road area TA for the travelable road area TA ahead of the travel position of the subject vehicle V and calculates the center point of the proper travelable road area TA by using the Newtonian method. The equipotential line calculation unit 113 calculates the proper start position TR0 of the center line of the travelable road area TA by the Newtonian method described above, and then, as illustrated in the right diagram of FIG. 11, calculates the center point of the travelable road area TA at the position TR1, which is the predetermined distance ahead of the traveling direction of the subject vehicle V, by using the fourth-order Runge-Kutta method (RK4). Then, the equipotential line calculation unit 113 repeats this process to calculate the center point of the travelable road area TA at the position TRn ahead of the travelable road area TA as indicated in the right diagram of FIG. 11. Then, the equipotential line calculation unit 113, as illustrated in FIG. 12, combines these center points to form the center line CL of the travelable road area TA as the travel route TR, and outputs it to the slope calculation unit 114. The slope calculation unit 114, together with the travelable road area width W calculated above, holds the information of the travel route TR, and outputs it to the travel route tracking control unit 12.

Incidentally, the equipotential line calculation unit 113 also calculates the center point of the travelable road area TA at the position TRn ahead of the travelable road area TA for the section in which the potential value of the left-side boundary line EL and/or the right-side boundary line ER is corrected by the boundary condition correcting unit 111. This is because, as illustrated in FIGS. 8 and 9, the solution of the Laplace's Equation obtained by using the potential value of the corrected left-side boundary line EL and/or the right-side boundary line ER corresponds to the corrected center line CLa of the travelable road area.

The travel route tracking control unit 12 sets the travel route TR of the subject vehicle V acquired from the travel route calculation unit 11 as a target route. The travel route tracking control unit 12 controls a steering device including a steering actuator that executes steering control of the subject vehicle V, an acceleration and deceleration device including an accelerating actuator (or a fuel injection or a current of a driving source motor) that executes acceleration or deceleration control of the subject vehicle V, and a braking device including a braking actuator that executes braking control of the subject vehicle V.

Next, with reference to the flowchart of FIG. 4, a control procedure of the travel control device VTC of the vehicle according to the present embodiment is described. FIG. 4 is the flowchart illustrating the processing procedure executed by the travel control device VTC of the vehicle illustrated in FIG. 1. The configuration of the travel control device VTC of the vehicle according to the present embodiment described above is based on the generalized roads as illustrated in FIGS. 5, 6, 11 and 12. However, in the following control procedure, in order to facilitate understanding of the operation and effectiveness of the present embodiment, a scene in which the subject vehicle V travels on a simple road R illustrated in FIG. 13 will be described. The road R illustrated in FIG. 13 illustrating one lane on the left side in a country with traffic laws and regulations for left-hand traffic, such as Japan or the United Kingdom. Further, it is assumed that this road R is wider than the general road width of 3.5 m, e.g., around 5 to 6 m, and parking is permitted in the side of the road.

First, in step S1 of FIG. 4, the first travelable road area boundary information in the horizontal plane of the road area in which the subject vehicle V can travel is detected. The first travelable road area boundary information is detected based on the current position information of the subject vehicle V acquired by the travelable road area boundary acquiring unit 1 and the map information in which road boundary information is defined. At the same time, in step S2, the objects around the subject vehicle V and the road situations acquired by the travelable road area boundary acquiring units 2 to 5 are acquired as the surrounding information. Then, based on the surrounding information, the second travelable road area boundary information in the horizontal plane of the road area in which the subject vehicle V can travel is detected. The first travelable road area boundary information enables to recognize the road shapes other than the obstacles in the vicinity of the subject vehicle V, and the second travelable road area boundary information enables to recognize the presence or absence and the type of both near and far obstacles around the subject vehicle V.

In step S3, the travelable road area boundary combination unit 6 combines the first travelable road area boundary information and the second travelable road area boundary information acquired by the travelable road area boundary acquiring units 1 to 5 to generate the combined travelable road area boundary information. That is, for the scene illustrated in FIG. 13, the travelable road area boundary combination unit 6 calculates the travelable road area TA in which the subject vehicle V can travel. The travelable road area TA is calculated by subtracting the presence area of the obstacles V1, V2 and V3, recognized from the location information of the obstacles V1, V2, and V3 acquired by the travelable road area boundary acquiring units 2 to 5, from the area of the road R recognized from the current position information of the subject vehicle V acquired by the travelable road area boundary acquiring unit 1 and the three-dimensional high-definition map information on its surroundings.

In addition, in step S4, the travelable road area boundary combination unit 6 divides the combined travelable road area boundary information to the left-side travelable road area boundary information regarding the left-side boundary line EL and the right-side travelable road area boundary information regarding the right-side boundary line ER, in the travelable road area in which the subject vehicle V can travel. As for the scene illustrated in FIG. 13, since the travelable road area boundary acquiring units 2 to 5 acquire the presence of three stationary obstacles (parked vehicles) V1, V2, and V3 on the left side of the road R, the left-side boundary line EL is the line illustrated by the dotted line. On the other hand, since there are no obstacles on the right side of the road R, the right-side boundary line ER is the same line as the right edge RR of the road. The left-side travelable road area boundary information regarding the divided left-side boundary line EL and the right-side travelable road area boundary information regarding the divided right-side boundary line ER are indicated in the left diagram of FIG. 14.

Figure 14:
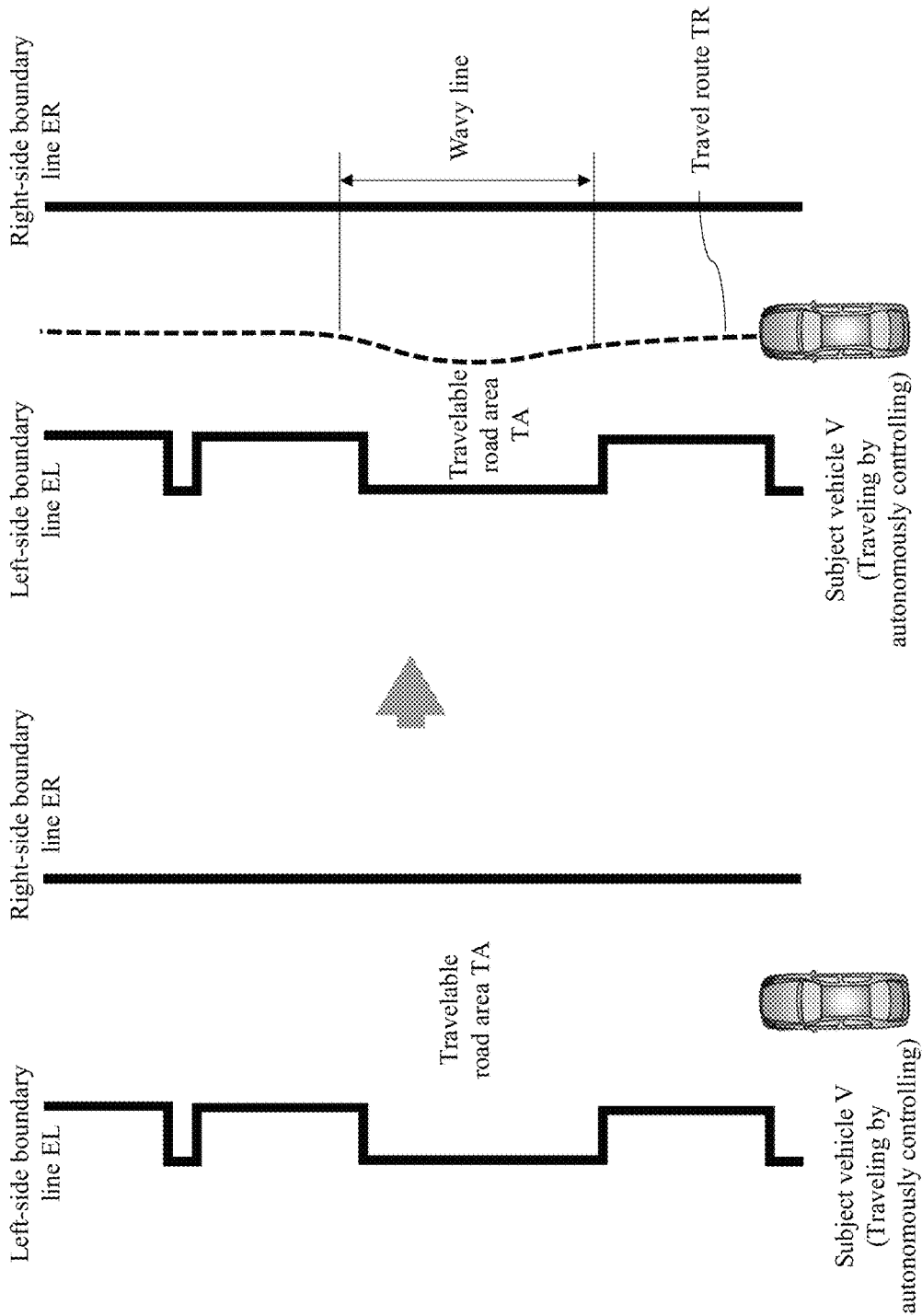
FIG. 14 is a plan view (Part 1) for explaining a process executed by using the travel control device for a vehicle of the present invention regarding the scene of FIG. 13.

As described in the Background Art column, when the travel route of the vehicle is generated based on the set curvature parameters by the Support Vector Machine from the left-side boundary line EL, the right-side boundary line ER and the travelable road area TA defined by them illustrated in the left diagram of FIG. 14, it will cause discomfort to the occupants. This is because, as illustrated in the right diagram of FIG. 14, when the section in which there are no parked vehicles as the obstacles is long, the travel route TR is wavy in this section. In particular, for the road R having a width of around 5 to 6 m as illustrated in FIG. 13 and having side of the road parking permitted, it is better to travel along the right edge of the road RR as a reference rather than to travel along the center of the travelable road area TA to generate a smooth travel route with or without vehicles parked in the side of the road.

Therefore, in steps S5 to S13, the travel control device VTC for a vehicle of the present embodiment calculates the present travelable road area TA illustrated in the left diagram of FIG. 14 by using the Laplace's Equation solution so that the position offset from the right-side boundary line ER to the left direction by X2 (m) becomes the travel route TR of the subject vehicle V regardless of whether there are parked vehicles V1, V2 and V3 in the left side of the road.

That is, in step S5, the potential value calculation unit 101 of the travelable road area width calculation unit 10 uses the Substitute Charge Method to generate the potential field, as illustrated in the left view of FIG. 15, for the left-side boundary line EL, the right-side boundary line ER and the travelable road area TA defined by them as determined in step S4. Then, the potential value calculation unit 101 generates the potential field in the two-dimensional space of the travelable road area TA (x-y plane) wherein the left-side boundary line EL is the first potential value (e.g., +3V) and the right-side boundary line ER is the second potential value (e.g., −3V). In step S6, the equipotential line calculation unit 102 acquires the equipotential electric charge lines (equipotential lines) by searching for a reference position at which the electric charge (potential value) is equal. Then, in step S7, the slope calculation unit 103 calculates the slope k from the solution of potential field, and then calculates the travelable road area width W from the equation W=2P/k illustrated in FIG. 7, and outputs it to the boundary condition setting unit 9. Incidentally, the travelable road area width W, as illustrated in the right diagram of FIG. 15, is calculated at predetermined distance intervals for the travelable road area TA ahead of the subject vehicle V. The slope calculation unit 103, together with the calculated travelable road area width W, holds the information of the center line CL of the travelable road area TA, and outputs it to the boundary condition setting unit 9.

In step S8, the road environment recognition unit 7, the lateral position instruction unit 8 and the boundary condition setting unit 9 compare the lateral positions. In other words, the lateral position instruction unit 8 detects, from the road environment and the national information acquired by the road environment recognition unit 7, that the road R on which the subject vehicle V is traveling is a lane with many parked vehicles and is the country of left-side travel, as illustrated in FIG. 10. Therefore, the lateral position instruction unit 8 extracts, as the content of the lateral position command, the command for setting the position of "X2 (for example, 1.5 m) from the right edge of the travelable road area" to the center line of the travel route TR. Then, in step S9, the boundary condition setting unit 9 determines whether there is a difference between the position of the center line CL of the travelable road area TA of the travelable road area width W obtained by the travelable road area width calculation unit 10 and the position at "X2 (e.g., 1.5 m) from the right edge of the travelable road area" extracted by the lateral position instruction unit 8 by comparing these positions as illustrated in FIG. 9. In this determination, the difference does not necessarily have to be 0, and the presence of such the difference as not to give a sense of discomfort to the occupants may be permitted. Further, the determination of the presence or absence of this difference is executed for each predetermined distance interval in which the travelable road area width W is obtained, illustrated in the right diagram of FIG. 15.

In step S9, when it is determined that there is the difference, the process proceeds to step S10, and when it is determined that there is no difference, the process proceeds to step S11. In step S10 wherein it is determined that there is the difference, as illustrated in FIG. 9, the position of the center line CL of the travelable road area TA of the travelable road area width W acquired by the travelable road area width calculation unit 10 is different from the position of "X2 (e.g., 1.5 m) from the right edge of the travelable road area" extracted by the lateral position instruction unit 8. Therefore, as illustrated by the dotted line in FIG. 9, the boundary condition setting unit 9 calculates the potential value $P_{1L}$ of the left-side boundary line EL and the potential value $-P_{1R}$ of the right-side boundary line ER, which is the boundary condition, so that the position at which the potential value P becomes 0 is the position CLa offset by X2 to the left direction from the right-side boundary line of the travelable road area TA. Specifically, the slope k is acquired by the slope calculation unit 103 of the travelable road area width calculation unit 10 indicated by the solid line, and $P_{1L}$ and $P_{1R}$ are calculated by using the relational expressions $P_{1L}=+P-(2P^2/kX2)$, $P_{1R}=-P$. These potential values $P_{1L}$ and $P_{1R}$ are output as the boundary conditions to the boundary condition correcting unit 111 of the travel route calculation unit 11. The boundary condition correcting unit 111 corrects the potential value of the left-side boundary line EL regarding the left boundary information acquired by the boundary condition setting unit 9 and the potential value of the right-side boundary line ER regarding the right boundary information. The left diagram of FIG. 16 indicates the area in which the potential value is corrected in the travelable road area TA ahead of the subject vehicle V. In this example, as illustrated in FIG. 9, the initial potential value +P is corrected to the larger potential value +Pa.

In step S11, the travel route calculation unit 11 sets the corrected potential values (or the initial potential values for the uncorrected section) indicated in FIG. 16 to the left-side boundary line EL and the right-side boundary line ER. Then, the travel route calculation unit 11 uses the Substitute Charge Method to generates the potential field in the two-dimensional space (x-y plane) of the travelable road area TA. In step S12, the equipotential line calculation unit 113 acquires the equipotential electric charge lines (equipotential lines) by searching for the reference position at which the electric charge (potential value) is equal (the position at which the potential value is 0V in this example) using the Newtonian and the fourth-order Runge-Kutta methods described above. Since these equipotential lines become the travel route TR of the subject vehicle V illustrated in the right diagram of FIG. 16, these are output to the travel route tracking control unit 12 as the travel route TR in step S13. In step S12, the travel route tracking control unit 12 executes the autonomous travel control by autonomously controlling the steering device, the acceleration and deceleration driving device, and the braking device of the subject vehicle according to the position information of the acquired travel route TR.

In the above-described embodiment, the potential value of the left-side boundary line EL is set to +P (for example, a voltage of +3V) and the potential value of the right-side boundary line ER is set to −P (for example, a voltage of −3V), and the solution of the Laplace's Equation related to the potential value of the travelable road area TA is calculated by the Substitute Charge Method. Thus, the position in which potential value becomes 0 is set to the position of the travel route TR. However, these +P, −P and 0 are merely illustrative and do not limit the present invention. In the travel control method and the travel control device for a vehicle according to the present invention, at least, the potential field may be generated by setting the potential value of the left-side boundary line EL and the potential value of the right-side boundary line ER to different values from each other, and the potential value which is the solution of the Laplace Equation may be calculated. Thus, for example, when the potential value of the left-side boundary line EL is set to +2P (e.g., +6V voltage) and the potential value of the right-side boundary line ER is set to −P (e.g., −3V voltage), the solution of Laplace Equation for the potential value of the travelable road area TA is calculated by the Substitute Charge Method, and the position in which the potential value becomes +3 is the travel route TR, the result will be the same. In addition, the solution of the potential field is not limited to the Substitute Charge Method for the electric field, but may also be the diffusion equation for thermal conduction with respect to the temperature distribution in the solid contacting the heat source as described above, it may also be the equation for solving the gravitational potential in the gravitational field.

As described above, according to the travel control device VTC and the travel control method for a vehicle of the present embodiment, the lateral position of the travel route set in advance and the lateral position of the travel route set on the basis of the calculated travelable road area width are compared to calculate the difference. Then, the first potential value and/or the second potential value are corrected so that the absolute value of the calculated differences is equal to the predetermined value or less. Then, the travel route for the subject vehicle according to the equipotential lines of the potential field is generated by the corrected potential value. Therefore, regardless of the presence or absence of the obstacles, it is possible to generate the travel route along the lateral position of the travel route set in advance by low load calculation. Thus, it is possible to achieve the smooth autonomous travel control by eliminating the discomfort of the occupants.

Further, according to the travel control device VTC and the travel control method for a vehicle of the present embodiment, in obtaining the left-side travelable road area boundary information and the right-side travelable road area boundary information, the first travelable road area boundary information in the horizontal plane of the road area in which the subject vehicle can travel is detected on the basis of the current position information of the subject vehicle and the map information in which the road boundary information is defined. Then, the objects around the subject vehicle and the road situations are acquired as the surrounding information to detect the second travelable road area boundary information in the horizontal plane of the road area in which the subject vehicle can travel on the basis of the surrounding information. Then, the combined travelable road area boundary information is generated by combining the first travelable road area boundary information and the second travelable road area boundary information, and the combined travelable road area boundary information is divided to the left-side travelable road area boundary information and the right-side travelable road area boundary information. Therefore, by the first travelable road area boundary information, it is possible to recognize the road shapes other than obstacles in the vicinity of the subject vehicle V. Further, by the second travelable road area boundary information, it is possible to recognize the presence or absence and type of both near and far obstacles around the subject vehicle V. As a result, it is possible to acquire the left-side travelable road area boundary information and the right-side travelable road area boundary information that contain both static information and dynamic information with high precision.

Further, according to the travel control device VTC and the travel control method for a vehicle of the present embodiment, the lateral position of travel route set in advance is one of the lateral center position of the travelable road area, the position away from the right edge of the travelable road area in left direction by the first predetermined distance, and the position away from the left edge of travelable road area in right direction by the second predetermined distance. Thus, when it is the lateral center position of the travelable road area, it is possible to generate the travel route that gives occupants a higher sense of security. On the other hand, when it is the position away from the right edge of the travelable road area in left direction by the first predetermined distance or the position away from the left edge of travelable road area in right direction by the second predetermined distance, it is possible to generate the travel route corresponding to the road environment.

Further, according to the travel control device VTC and the travel control method for a vehicle of the present embodiment, the lateral positions of the travel route and the lateral positions related with the road environment information on which the subject vehicle travels are stored in advance. Then, the road environment information on which the subject vehicle travels is acquired to extract the lateral position of the travel route related with the road environment information on the basis of the stored lateral position. Therefore, the travel route corresponding to the road environment can be generated without increasing the calculation load.

Further, according to the travel control device VTC and the travel control method for a vehicle of the present embodiment, each frequency in travel direction of the left-side travelable road area boundary information and the right-side travelable road area boundary information are calculated. Then, the lateral position of the travel route is extracted on the basis of the travelable road area boundary information of the smaller frequency of the left-side travelable road area boundary information and the frequency of the right-side travelable road area boundary information. Therefore, it is possible to realize the smooth autonomous travel control by further eliminating the discomfort of the occupants.

Further, according to the travel control device VTC and the driving control method for a vehicle of the present embodiment, the approximate solution of the Laplace's Equation is used for the potential value of potential field. Therefore, the generation of wavy travel route is suppressed, it is possible to realize the smooth autonomous travel control by further eliminating the discomfort of the occupants.

Further, according to the travel control device VTC and the travel control method for a vehicle of the present embodiment, the left-side travelable road area boundary information and the right-side travelable road area boundary information are converted into the sequential straight lines information respectively, and the harmonic function defined by the position, the direction, and length of each line segment of the sequential straight lines information is used as basis function, and the approximate solution of the linear combinations of the sequential straight lines information is used for the potential value of the potential field. Therefore, the approximate solution can be obtained by low load calculation.

Further, according to the travel control device VTC and the travel control method for a vehicle of the present embodiment, the travelable road area boundary information is converted into the complex number information with the target horizontal plane as a complex plane, the basis function is used as the complex regular analytic function, and the complex potential as approximate solution of the linear combinations are used for the potential value of the potential field. Therefore, the slope of the potential value can be obtained with low calculation load.

Further, according to the travel control device VTC and the travel control method for a vehicle of the present embodiment, when $z$ is the complex variable, the basis function is defined as $f(z)=\ln(z1-z)+\ln\{(z1-z)/(z0-z)\}$ $(z0-z)/(z1-z0)$. Thus, a continuum of potential value can be obtained by taking only the real part. Therefore, the computation speed can be increased and when the left travelable road area boundary line and the right travelable road area boundary line are parallel, the computation error can be reduced to 0.

According to the travel control device VTC and the travel control method for a vehicle of the present embodiment, the middle point of each line segment of the sequential straight lines information is selected as the application location of the Dirichlet Conditions, and the coefficients of the linear combinations are obtained by applying the Substitute Charge Method. Therefore, it is possible to obtain calculation results with low calculation load and small error.

DESCRIPTION OF REFERENCE NUMERALS

VTC . . . Travel control device for a vehicle
1 . . . Travelable road boundary acquiring unit (High-definition map information)
2 . . . Travelable road area boundary acquiring unit (Laser rangefinder information)
3 . . . Travelable road area boundary acquiring unit (radar information)
4 . . . Travelable road area boundary acquiring unit (camera information)
5 . . . Travelable road area boundary acquiring unit (Around View Monitor information)
6 . . . Travelable road area boundary combination unit
7 . . . Road environment recognition unit
8 . . . Lateral position instruction unit
9 . . . Boundary condition setting unit
10 . . . Travelable road area width calculation unit
101 . . . Potential value calculation unit
102 . . . Equipotential line calculation unit
103 . . . Slope calculation unit
11 . . . Travel route calculation unit
111 . . . Boundary condition correcting unit
112 . . . Potential value calculation unit
113 . . . Equipotential line calculating unit
114 . . . Slope calculation unit
12 . . . Travel route tracking control unit
V . . . Subject vehicle
R . . . Road
TA . . . Travelable road area
TR . . . Travel route
EL . . . Left-side boundary line
ER . . . Right-side boundary line
P . . . Potential value
PF . . . Potential field
W . . . Travelable road area width

The invention claimed is:

1. A travel control method for a subject vehicle, comprising:
acquiring left-side travelable road area boundary information regarding a left-side boundary line of a travelable road area in which the subject vehicle can travel and right-side travelable road area boundary information regarding a right-side boundary line of the travelable road area;
generating a potential field in a space of the travelable road area wherein the left-side boundary line of the left-side travelable road area boundary information is set to a first potential value and the right-side boundary line of the right-side travelable road area boundary information is set to a second potential value different from the first potential value in the potential field;

correcting at least one of the first potential value and the second potential value so that an absolute value of a difference between a lateral position of a first travel route set in advance in the travelable road area on a basis of the left-side boundary line or the right-side boundary line and a lateral position of a second travel route set on a basis of a third potential value between the first potential value and the second potential value in the potential field is equal to a predetermined value or less;

generating a corrected potential field in the space of the travelable road area wherein the left-side boundary line of the left-side travelable road area boundary information is set to a corrected first potential value and the right-side boundary line of the right-side travelable road area boundary information is set to a corrected second potential value in the corrected potential field;

generating a target travel route in which the subject vehicle travels on a basis of equipotential lines in the generated corrected potential field; and executing autonomous travel control of the subject vehicle according to the generated target travel route.

2. The travel control method for the subject vehicle according to claim 1, wherein the acquiring the left-side travelable road area boundary information and the right-side travelable road area boundary information includes:

detecting first travelable road area boundary information in a horizontal plane of a road area in which the subject vehicle can travel on a basis of current position information of the subject vehicle and map information in which road boundary information is defined;

acquiring as surrounding information an object around the subject vehicle and a road situation to detect second travelable road area boundary information in the horizontal plane of the road area in which the subject vehicle can travel on a basis of the surrounding information;

combining the first travelable road area boundary information and the second travelable road area boundary information to generate combined travelable road area boundary information; and dividing the combined travelable road area boundary information to the left-side travelable road area boundary information and the right-side travelable road area boundary information.

3. The travel control method for the subject vehicle according to claim 1, wherein the lateral position of the first travel route set in advance in the travelable road area is one of a lateral center position of the travelable road area, a position away from the right-side boundary line of the travelable road area in left direction by a first predetermined distance, and a position away from the left-side boundary line of the travelable road area in right direction by a second predetermined distance.

4. The travel control method for the subject vehicle according to claim 3, comprising:

storing in advance lateral positions of the first travel route, the lateral positions being related with road environment information on which the subject vehicle travels; and acquiring the road environment information on which the subject vehicle travels to extract the lateral position of the first travel route related with the road environment information on a basis of the stored lateral positions.

5. The travel control method for the subject vehicle according to claim 3, comprising:

calculating each frequency in travel direction of the left-side travelable road area boundary information and the right-side travelable road area boundary information; and extracting the lateral position of the first travel route on a basis of the travelable road area boundary information of the smaller of the frequency of the left-side travelable road area boundary information and the frequency of the right-side travelable road area boundary information.

6. The travel control method for the subject vehicle according to claim 1, wherein an approximate solution of Laplace's Equation is used for the third potential value of the potential field.

7. The travel control method for the subject vehicle according to claim 6, wherein the left-side travelable road area boundary information and the right-side travelable road area boundary information are converted into sequential straight lines information respectively, a harmonic function defined by a position, a direction and length of each line segment of the sequential straight lines information is used as a basis function, and an approximate solution of linear combinations of the sequential straight lines information is used for the third potential value of the potential field.

8. The travel control method for the subject vehicle according to claim 7, wherein the left-side travelable road area boundary information and the right-side travelable road area boundary information are converted into complex number information with a target horizontal plane as a complex plane, the basis function is used as a complex regular analytic function, and a complex potential as the approximate solution of the linear combinations is used for the third potential value of the potential field.

9. The travel control method for the subject vehicle according to claim 8, wherein when z is a complex variable, the basis function is $$f(z)=\ln(z1-z)+\ln\{(z1-z)/(z0-z)\}(z0-z)/(z1-z0).$$

10. The travel control method for the subject vehicle according to claim 7, wherein a middle point of each line segment of the sequential straight lines information is selected as an application location of Dirichlet Conditions, and a coefficient of the linear combinations is obtained by applying a Substitute Charge Method.

11. A travel control device for a vehicle, the travel control device generating a target travel route of a subject vehicle and controlling any one of a steering device, a driving device and a braking device according to the target travel route to execute autonomous travel control, the travel control device configured to:

acquire left-side travelable road area boundary information regarding a left-side boundary line of a travelable road area in which the subject vehicle can travel and right-side travelable road area boundary information regarding a right-side boundary line of the travelable road area;

generate a potential field in a space of the travelable road area wherein the left-side boundary line of the left-side travelable road area boundary information is set to a first potential value and the right-side boundary line of the right-side travelable road area boundary information is set to a second potential value different from the first potential value in the potential field;

correct at least one of the first potential value and the second potential value so that an absolute value of a difference between a lateral position of a first travel route set in advance in the travelable road area on a basis of the left-side boundary line or the right-side boundary line and a lateral position of a second travel route set on a basis of a third potential value between the first potential value and the second potential value in the potential field is equal to a predetermined value or less;

generate a corrected potential field in the space of the travelable road area wherein the left-side boundary line of the left-side travelable road area boundary information is set to a corrected first potential value and the right-side boundary line of the right-side travelable road area boundary information is set to a corrected second potential value in the corrected potential field;

generate the target travel route in which the subject vehicle travels on a basis of equipotential lines in the generated corrected potential field; and execute the autonomous travel control of the subject vehicle according to the generated target travel route.

* * * * *